US009654942B2

(12) United States Patent
Lee et al.

(10) Patent No.: US 9,654,942 B2
(45) Date of Patent: May 16, 2017

(54) SYSTEM FOR AND METHOD OF TRANSMITTING COMMUNICATION INFORMATION

(71) Applicant: SAMSUNG ELECTRONICS CO., LTD., Suwon-si (KR)

(72) Inventors: Kyung-tak Lee, Yongin-si (KR); Youn-gun Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/691,212

(22) Filed: Apr. 20, 2015

(65) Prior Publication Data

US 2015/0230067 A1    Aug. 13, 2015

Related U.S. Application Data

(63) Continuation of application No. 13/956,883, filed on Aug. 1, 2013.

(30) Foreign Application Priority Data

Aug. 1, 2012    (KR) .................. 10-2012-0084584

(51) Int. Cl.
*H04M 1/725*    (2006.01)
*H04W 4/12*    (2009.01)
(Continued)

(52) U.S. Cl.
CPC ......... *H04W 4/12* (2013.01); *H04M 1/72547* (2013.01); *H04M 3/42263* (2013.01);
(Continued)

(58) Field of Classification Search
USPC ....................................... 455/412.2
See application file for complete search history.

(56) References Cited

U.S. PATENT DOCUMENTS 5,604,791 A    2/1997 Lee
5,903,833 A    5/1999 Jonsson et al.
(Continued)

FOREIGN PATENT DOCUMENTS

KR    1020060042661 A    5/2006
KR    100931306 A    12/2009
KR    1020110048682 A    5/2011

OTHER PUBLICATIONS

International Search Report (PCT/ISA/210) dated Nov. 1, 2013 issued by the International Searching Authority in International Application No. PCT/KR2013/006934.
(Continued)

*Primary Examiner* — Joel Ajayi
(74) *Attorney, Agent, or Firm* — Sughrue Mion, PLLC

(57) ABSTRACT

A system for and method of communication information transmission are provided. A method of communication information transmission performed by a first device includes: receiving a communication request from a second device; obtaining surrounding situation information of the first device, the surrounding situation information including information related to surroundings of the first device; and determining at least one third device to process the communication request based on the surrounding situation information.

16 Claims, 14 Drawing Sheets

(51) Int. Cl.
*H04M 3/42* (2006.01)
*H04M 3/54* (2006.01)
*H04W 4/16* (2009.01)
*H04W 8/22* (2009.01)

(52) U.S. Cl.
CPC ............ *H04M 3/543* (2013.01); *H04W 4/16* (2013.01); *H04W 8/22* (2013.01); *H04M 2201/20* (2013.01); *H04M 2203/2094* (2013.01); *H04M 2242/30* (2013.01); *H04M 2250/12* (2013.01); *H04M 2250/52* (2013.01)

(56) References Cited

U.S. PATENT DOCUMENTS

| | | |
|---|---|---|
| 7,058,036 B1 * | 6/2006 | Yu et al. ..................... 370/335 |
| 2004/0017788 A1 | 1/2004 | Shmueli et al. |
| 2006/0172766 A1 | 8/2006 | Kim et al. |
| 2007/0002835 A1 * | 1/2007 | Church et al. ............... 370/352 |
| 2007/0032225 A1 * | 2/2007 | Konicek ............ H04M 1/72513 455/417 |
| 2011/0047598 A1 | 2/2011 | Lindley et al. |
| 2013/0090926 A1 | 4/2013 | Grokop et al. |

OTHER PUBLICATIONS

Communication dated Nov. 14, 2013 issued by the European Patent Office in counterpart European Patent Application No. 13178866.3.
Non-Final Office Action dated Dec. 12, 2014 issued in U.S. Appl. No. 13/956,883.
Final Office Action dated Mar. 25, 2015 issued in U.S. Appl. No. 13/956,883.

* cited by examiner

SYSTEM FOR AND METHOD OF TRANSMITTING COMMUNICATION INFORMATION

CROSS-REFERENCE TO RELATED PATENT APPLICATION

This application is a continuation of U.S. application Ser. No. 13/956,883, filed on Aug. 1, 2013 in the U.S. Patent and Trademark Office, which claims the benefit of Korean Patent Application No. 10-2012-0084584, filed on Aug. 1, 2012, in the Korean Intellectual Property Office, the disclosure of which is incorporated herein in its entirety by reference.

BACKGROUND

1. Field

The present disclosure relates to a system for and method of communication information transmission in which communication information is provided from a device to another device based on surrounding situation information of the device.

2. Description of the Related Art

With recent advances in multimedia and network technologies, users may communicate with one other by using various devices, such as mobile phones, smart phones, computers, laptops, and televisions. Although more types of devices have become available to users, users may not be in possession of all of such devices at the same time. Accordingly, if one of the devices that a first user does not currently possess receives a communication request from a device of a second user, it may be inconvenient for the first user to search for the device that has received the communication request to communicate with the second user. Therefore, there is a demand for technologies that allow a user to effectively select another device owned by the user for processing a communication request from another user, as opposed to the user needing to select the device that has received the communication request, and that enable the selected device to process the communication request.

SUMMARY

One or more exemplary embodiments include a system for and method of communication information transmission in which communication information is provided, from a device which has received a communication request, to another device based on surrounding situation information of the device.

One or more exemplary embodiments include a system for and method of communication information transmission in which communication information is provided, from a device which has received a communication request, to another device for processing the communication request, if a user is not in the vicinity of the device.

According to an aspect of the exemplary embodiments, there is provided a method of communication information transmission performed by a first device, the method including: receiving a communication request from a second device; obtaining surrounding situation information of the first device, the surrounding situation information comprising information related to surroundings of the first device; and determining a third device for processing the communication request based on the surrounding situation information.

The method may further include transmitting information related to the communication request to the determined third device.

The obtaining of the surrounding situation information may include obtaining at least one of an image and voice data detected by the first device by using at least one of a camera and a microphone of the first device.

The method may further include determining whether a user of the first device is in a vicinity of the first device based on the obtained at least one of the image and the voice data, wherein the transmitting of the information related to the communication request may include transmitting the information related to the communication request to the third device if it is determined that the user of the first device is not in the vicinity of the first device.

The determining of whether the user of the first device is in the vicinity of the first device may include comparing at least one of an image and voice data of the user previously stored in the first device with the obtained at least one of the image and the voice data.

The determining of the third device may include receiving device information about devices connectable with the first device from a server, and determining the third device based on the received device information.

The determining of the third device may include determining the third device based on functions of the devices connectable with the first device, the functions being indicated by the received device information, and the functions of the devices may include at least one of a shooting function using a camera, a voice input function using a microphone, a voice output function using a speaker, a communication function, a printing function, and a displaying function.

The determining of the third device may include requesting device information from neighboring devices connectable with the first device and determining the third device among the neighboring devices based on the device information received from the neighboring devices.

The receiving of the communication request may include receiving at least one of a call request and a message from the second device, and the call request may include at least one of a voice call request and a video call request.

The determined third device may perform at least one of a call communication and a message transmission or message reception with the second device.

The transmitting of the information related to the communication request may include transmitting call request information of the second device to the determined third device if the communication request is a call request.

The transmitting of the information related to the communication request may include transmitting at least one of a voice call and a video call received from the second device to the determined third device if the communication request is a call request.

The transmitting of the information related to the communication request may include transforming at least one of the voice call and the video call into a format compatible with the determined third device, and transmitting the at least one of the transformed voice call and video call to the determined third device.

The transmitting of the information related to the communication request may include transmitting a phone number of the second device to the determined third device, and the transmitted phone number of the second device may be used by the determined third device to call the second device.

The communication request may include a message, and the transmitting of the information related to the communication request may include transmitting the message to the determined third device.

The transmitting of the information related to the communication request may include transforming the message into a format compatible with the determined third device and transmitting the transformed message to the determined third device.

The transmitting of the information related to the communication request may include transmitting a phone number of the second device to the determined third device, and the transmitted phone number of the second device may be used by the determined third device to transmit another message to or receive the message from the second device.

The obtaining of the surrounding situation information of the first device may include obtaining surrounding situation information of the first device by using a sensor of the first device, and the sensor may include at least one of a gyro sensor, a geo-magnetic sensor, an accelerometer sensor, a gravity sensor, a light sensor, a proximity sensor, a barometer, a motion recognition sensor, a compass, and an RGB sensor.

According to another aspect of the exemplary embodiments, there is provided a first device configured to transmit communication information, the first device including: a communication request receiver configured to receive a communication request from a second device; a situation information obtainer configured to obtain surrounding situation information of the first device, the surrounding situation information including information related to surroundings of the first device; and a device determiner configured to determine at least one third device to process the communication request based on the obtained surrounding situation information.

The first device may further include a communication information provisioner configured to transmit information related to the communication request to the determined third device.

The situation information obtainer may be configured to obtain at least one of an image and voice data detected by the first device by using at least one of a camera and a microphone of the first device.

The first device may further include an information transmission determiner configured to determine whether a user of the first device is in a vicinity of the first device based on the obtained at least one of the image and the voice data, and the communication information provisioner may be configured to transmit the information related to the communication request to the determined third device if it is determined that the user of the first device is in the vicinity of the first device.

The information transmission determiner may be configured to compare at least one of an image and voice data of the user previously stored in the first device with the obtained at least one of the image and the voice data to determine whether the user of the first device is in the vicinity of the first device.

The device determiner may be configured to receive device information about devices connectable with the first device from a server, and determine the third device based on the received device information.

The device determination unit may be configured to determine the third device based on functions of the devices connectable with the first device, the functions being indicated by the received device information, and the functions of the devices may include at least one of a shooting function using a camera, a voice input function using a microphone, a voice output function using a speaker, a communication function, a printing function, and a displaying function.

The device determiner may be configured to request device information from neighboring devices connectable with the first device and determine the at least one third device among the neighboring devices based on the device information received from the neighboring devices.

The communication request receiver may be configured to receive at least one of a call request and a message from the second device, and the call request may include at least one of a voice call request and a video call request.

The determined third device may be configured to perform at least one of a call communication and a message transmission or message reception with the second device.

The communication information provisioner may be configured to transmit call request information of the second device to the determined third device if the communication request is a call request.

The communication information provisioner may be configured to transmit at least one of a voice call and a video call received from the second device to the determined third device if the communication request is a call request.

The communication information provisioner may transform at least one of the voice call and the video call into a format compatible with the determined third device, and transmit the at least one of the transformed call voice and call video to the determined third device.

The communication information provisioner may be configured to transmit a phone number of the second device to the determined third device, and the transmitted phone number of the second device may be used by the determined third device to call the second device.

The communication request may include a message, and the communication information provisioner may transmit the message to the determined third device.

The communication information provisioner may transform the message into a format compatible with the determined third device and transmit the transformed message to the determined third device.

The communication information provisioner may transmit a phone number of the second device to the determined third device, and the transmitted phone number of the second device may be used by the determined third device to transmit another message to or receive the message from the second device.

The situation information obtainer may obtain surrounding situation information of the first device by using a sensor of the first device, and the sensor may include at least one of a gyro sensor, a geo-magnetic sensor, an accelerometer sensor, a gravity sensor, a light sensor, a proximity sensor, a barometer, a motion recognition sensor, a compass, and an RGB sensor.

According to another aspect of the exemplary embodiments, there is provided a non-transitory computer-readable recording medium having recorded thereon a program for causing a computer to execute the method of communication information transmission described above.

BRIEF DESCRIPTION OF THE DRAWINGS

The above and other features and advantages of the exemplary embodiments will become more apparent by describing in detail exemplary embodiments thereof with reference to the attached drawings in which.

DETAILED DESCRIPTION

Figure 1:
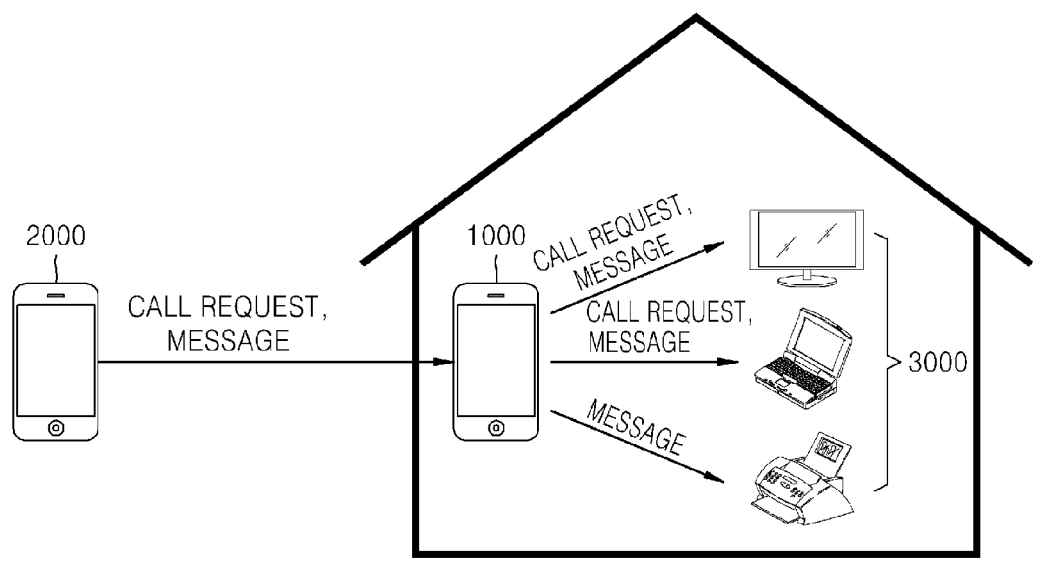
FIG. 1 is a schematic view of a communication information transmission system according to an exemplary embodiment.

Hereinafter, the present disclosure will now be described more fully with reference to the accompanying drawings, in which exemplary embodiments are shown. The exemplary embodiments may, however, be embodied in many different forms and should not be construed as being limited to the exemplary embodiments set forth herein; rather, these exemplary embodiments are provided so that this disclosure will be thorough and complete, and will fully convey the concept of the exemplary embodiments to those of ordinary skill in the art. In the following description, well-known functions or constructions are not described in detail so as not to obscure the exemplary embodiments with unnecessary detail. Also, throughout the specification, like reference numerals in the drawings denote like elements.

Throughout the specification, it will also be understood that when an element is referred to as being "connected to" another element, it can be directly connected to the other element, or electrically connected to the other element while intervening elements may also be present. Also, when a part is described as "including or "comprising" an element, unless there is a particular description contrary thereto, the part can further include other elements, and does not exclude the other elements.

As used herein, the term "communication information" refers to information related to call communications and transmission and reception of a message. Call communications may include a voice call and a video call. The message may include a message transmitted via email, short message service (SMS), multimedia messaging service (MMS), and a messenger program, although are not limited thereto.

FIG. 1 is a schematic view of a communication information transmission system according to an exemplary embodiment.

Referring to FIG. 1, a communication information transmission system according to an exemplary embodiment includes a first device 1000, a second device 2000, and at least one third device 3000.

When the second device 2000 submits a communication request or transmits a message to the first device 1000, the first device 1000 may obtain surrounding situation information of the first device 100. The first device 1000 may determine whether a user is in the vicinity of the first device 1000. If a user is not in the vicinity of the first device 1000, the first device 1000 may transmit information related to the call or message to at least one of the third devices 3000. In this regard, the first device 1000 may search for at least one of the third devices 3000 for processing the phone call or message. The third devices 3000 may communicate with the second device 2000 via a phone call or via transmission or reception of a message.

The first device 1000 may be any type of device connectable with the second device 2000 and the third device 300 via a wired or wireless network. Non-limiting examples of the first device 1000 include a smart phone, a mobile phone, a personal digital assistant (PDA), a digital TV, a printer, a media player, a global positioning system (GPS), a laptop, and any mobile or non-mobile computing devices.

The third device 3000 may include any type of device connectable with the first device 1000 and the second device 2000 via a wired or wireless network. Non-limiting examples of the third device 3000 include a smart phone, a mobile phone, a personal digital assistant (PDA), a digital TV, a printer, a media player, a global positioning system (GPS), a laptop, and any mobile or non-mobile computing devices.

For example, if the first device 1000 receives a call request from the second device 2000 while a user of the first device 1000 is watching TV in a living room and the first device 1000 has been left in a bedroom, the first device 1000 may determine that the user is not in the bedroom. The first device 1000 may also transmit call request information to the TV, which may consequently display the call request information on a screen of the TV and may perform call communication with the second device 2000 based on user input.

For example, if the first device 1000 receives a message from the second device 2000 while a user of the first device 1000 is working with a computer in a study room and the first device 1000 has been left in a bedroom, the first device 1000 may determine that the user is not in the bedroom. The first device 1000 may transmit the message received from the second device 2000 to the computer in the study room, which may consequentially display the received message on a screen of the computer. The computer may transmit a message to and receive a message from the second device 2000 based on user input.

For example, if the first device 1000 is left in a bedroom away from a user of the first device 100 and receives a message from the second device 2000, the first device 1000 may determine that the user is not in the bedroom. The first device 1000 may transmit the message received from the second device 2000 to a printer, which may consequentially print out the received message.

FIG. 2 is a schematic view illustrating the provision of call request information by the first device 1000 to a third device 3000, according to an exemplary embodiment.

Figure 2A:
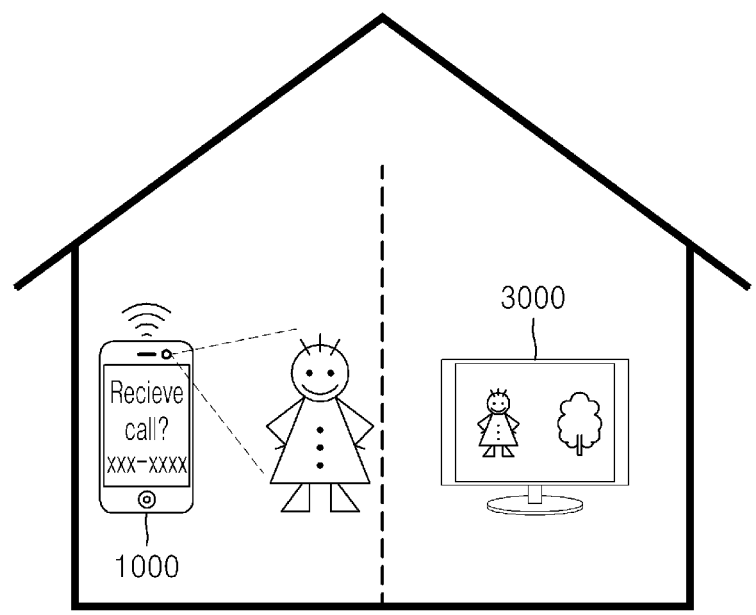
FIGS. 2A and 2B are schematic views illustrating the provision of call request information by a first device to a third device, according to an exemplary embodiment.

Referring to FIG. 2A, when the first device 1000 receives a call request from a second device (for example, the second device 2000 of FIG. 1), and determines that a user is in the vicinity of the first device 1000, the first device 1000 may display the call request information of the second device 2000 on a screen of the first device 1000. In this case, the first device 1000 may not provide the call request information to the third device 3000.

Figure 2B:
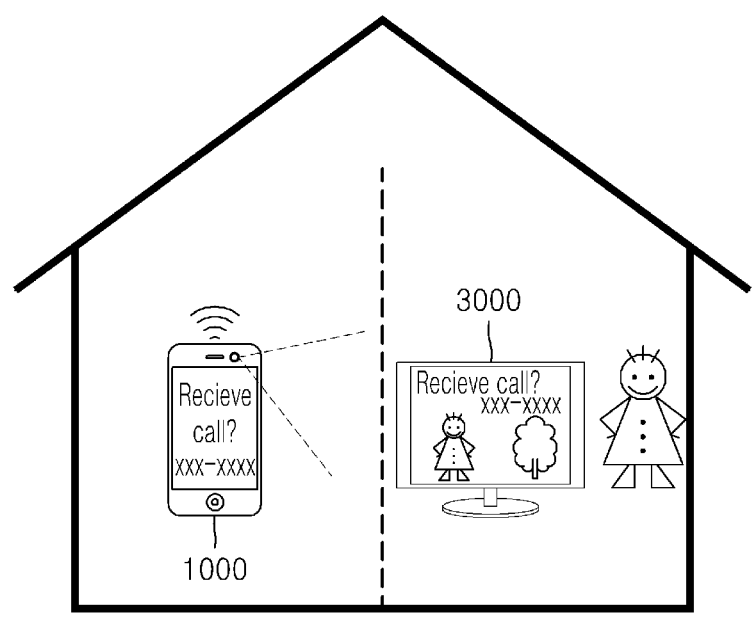

Referring to FIG. 2B, when the first device 1000 receives a call request from a second device (for example, the second device 2000 of FIG. 1), and determines that a user is not in the vicinity of the first device 1000, the first device 1000 may provide call request information of the second device 2000 to the third device 3000, which may consequentially display the received call request information on a screen of the third device 3000. In this regard, the call request information may be displayed to overlap the content being displayed on the screen of the third device 3000.

Figure 3:
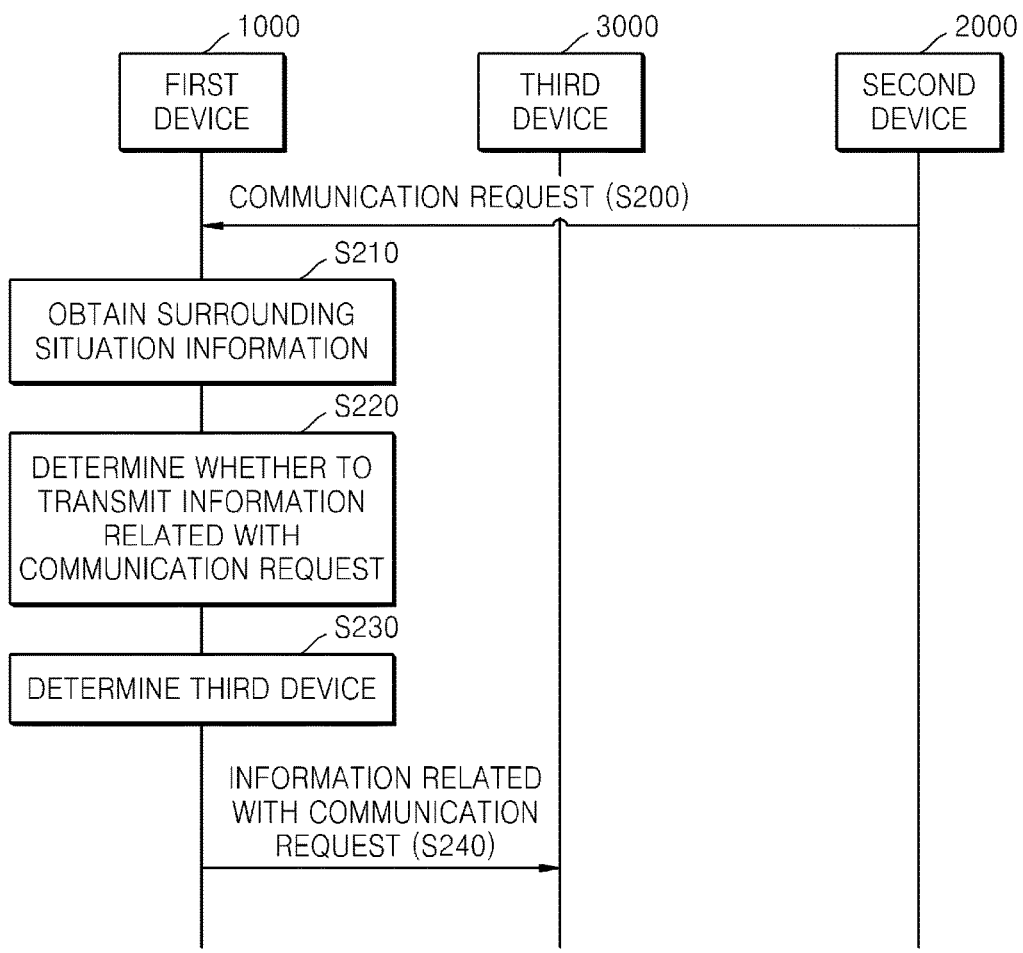
FIG. 3 is a flowchart of a communication information transmission method according to an exemplary embodiment.

FIG. 3 is a flowchart of a communication information transmission method according to an exemplary embodiment.

In operation S200, the first device 1000 receives a communication request from the second device 2000. The first device 1000 may receive a call request or a message from the second device 2000. The call request may be a voice call request or a video call request. The message may be any message transmitted via an e-mail, a short message service (SMS), a multimedia messaging service (MMS), a messenger program, or other communication technique. When a call request is received from the second device 2000, the first device 1000 may audibly alert the user of the call request.

In operation S210, the first device 1000 obtains surrounding situation information of the first device 1000. The first device 1000 may obtain the surrounding situation information of the first device 1000 by using at least one of a camera, a microphone, and a sensor in the first device 1000.

For example, the first device 1000 may shoot surroundings of the first device 1000. In particular, the first device 1000 may execute a camera application upon the reception of a call request from the second device 2000, and may control the camera application to shoot surroundings of the first device 1000. When the first device 1000 shoots a moving picture, frames of the shot moving picture may be compared to each other to identify a difference in color or brightness. When a user is identified in the shot image, the first device 1000 may identify whether the user is an authorized user of the first device 1000. The first device 1000 may also determine whether to activate a front camera or a rear camera depending on a positional state of the first device 1000.

For example, the first device 1000 may also record sounds around the first device 1000 by using a microphone. In particular, the first device 1000 may execute a voice recording application upon the reception of a call request from the second device 2000, and may control the voice recording application to record sounds around the first device 1000. The first device 1000 may also monitor a volume variation in the recorded sound. For example, when the first device 1000 is picked up by a user, the first device 1000 may detect a volume variation in the sounds around the first device 1000.

The first device 1000 may obtain surrounding situation information of the first device 1000 by using various sensors. For example, the first device 1000 may execute a sensor application upon the reception of a call request from the second device 2000, and may control the sensor application to obtain surrounding situation information of the first device 1000. For example, the various sensors may include at least one of a gyro sensor, a geo-magnetic sensor, an accelerometer sensor, a gravity sensor, a light sensor, a proximity sensor, a barometer, a motion recognition sensor, a compass, and a red-green-blue (RGB) sensor, although are not limited thereto. The first device 1000 may monitor a variation in values obtained from the surrounding situation information sensed by the various sensors.

The first device 1000 may obtain surrounding situation information of the first device 1000 via a home network system (not shown). For example, the home network system may be a security system, but is not limited thereto. The home network may include a gateway (not shown), the first device 1000, a third device 3000, and various devices within a home. The various devices within the home may include, for example, a surveillance camera, a voice collection device, a temperature sensor, and a humidity sensor. The gateway may obtain situation information of the home through various devices within the home. For example, the gateway may receive an image shot by a surveillance camera, voice obtained by a voice recording device, and sensing information obtained by a temperature sensor and a humidity sensor. The first device 1000 may also receive the obtained situation information from the gateway.

In operation S220, the first device 1000 determines whether to transmit information related to the communication request. The first device 1000 determines whether a user is in the vicinity of the first device 1000, and further determines whether that user is an authorized user of the first device 1000.

For example, when a user picks up the first device 1000 or moves toward the first device 1000, the brightness of an image shot by the first device 1000 may become darker or the volume of a recorded voice may go up. Accordingly, the first device 1000 may determine that a user is in the vicinity of the first device 100 by sensing these changes. If a user moves while carrying the first device 1000, the first device 1000 may sense the movement of the first device 1000 by using a motion sensor. As a result, the first device 1000 may determine that a user is in the vicinity of the first device 1000 based on the sensed movement.

The first device 1000 may sense the face of a user in a shot image, and determine whether the user in the shot image is an authorized user of the first device 1000. The first device 1000 may identify whether the user in the shot image is an authorized user of the first device 1000 based on many different types of criteria, including, for example, a shape of the user's face, and shapes and positions of the user's eyes, nose, and mouth.

Whether the user in the shot image is an authorized user of the first device 1000 may be determined based on user information stored in a memory of the first device 1000. In this regard, a shot image of the authorized user of the first device 1000 may be stored in the memory of the first device 1000 beforehand. According to another exemplary embodiment, whether the user in the shot image is an authorized user of the first device 1000 may be determined based on user information stored in a server (not shown). For example, whether the user in the shot image is an authorized user of the first device 1000 may be determined based on analyzing a user image stored in a social networking service (SNS) server corresponding to the first device 1000.

The first device 1000 may also determine whether a user is in the vicinity of the first device 1000, based on a combination of at least two of the above-described criteria, for example, a shot surrounding image, a recorded voice, and sensing information.

The first device 1000 may determine whether the recorded voice is a voice of an authorized user of the first device 1000. In this regard, the voice of the authorized user of the first device 1000 may be previously stored in the first device 1000 or a server (not shown).

If it is determined that a user is not in the vicinity of the first device 1000, or that a user in the vicinity of the first device 1000 is not an authorized user, the first device 1000 may transmit the information related to the communication request.

The first device 1000 may also determine whether a user is in the vicinity of the first device 1000 based on user location information received from the gateway (not shown). In this regard, the gateway may generate the user location information about the user's location at home based on situation information obtained by various devices within the home. For example, the gateway may generate user location information about the user's location at home based on an image shot by a surveillance camera, voice data obtained via a voice recording device, and sensing information obtained via a temperature sensor and a humidity sensor. The user location information may include information about which of the home devices a user is most near to.

The first device 1000 may receive the user location information generated by the gateway, and may determine whether a user is in the vicinity of the first device 1000 based on the received user's location information.

In operation S230, the first device 1000 determines a third device 1000 for processing the communication request. The first device 1000 may search for and choose at least one of the third devices 3000 for executing operation related to the communication request. The execution of the operation related to the communication request may include displaying the information related with the communication request or communicating with the second device 2000.

In particular, the first device 1000 may request, for example, from a server (not shown), device information about devices connectable with the first device 1000, and search for at least one third device 3000 based on the device information received from the server. In this regard, the device information about devices connectable with the first device 1000 may be previously stored in the server. The server may be an external server outside the home or a home gateway for home networking, but is not limited thereto.

The device information may include various kinds of information about devices, for example, information indicating types and functions of devices. For example, the information about a device function may include information about at least one of a shooting function using a camera, a voice input function using a microphone, a voice output function using a speaker, a communication function, a printing function, and a displaying function.

The first device 1000 may determine the at least one third device 3000 based on a type of the requested communication. For example, when the first device 1000 receives a video call request from the second device 2000, the first device 1000 may determine (e.g., select) a TV set with a shooting function, a voice input/output function, and a displaying function, among the neighboring devices around the first device 1000, as the third device 3000. For example, when the first device 1000 receives a message from the second device 2000, the first device 1000 may determine a laptop with a displaying function and a network communication function, among the neighboring devices, as the third device 3000. For example, when the first device 1000 receives a message from the second device 2000, the first device 1000 may determine a printer with a printing function, among the neighboring devices, as the third device 300.

The first device 1000 may search for at least one third device 3000, and may determine to provide the communication information to every searched third device 3000. The first device 1000 may select a device from the searched third devices 3000 as a device for receiving the communication information. In this regard, the searched third devices 3000 may each determine whether a user is in the vicinity of the first device 1000, and the first device 1000 may select the third device that is closest to the user of the first device 1000 as a device to be provided with the information related to the communication request. In this regard, the third devices 3000 may each identify whether a user is in the vicinity of the third device 3000 by using a camera, a microphone, and various sensors in the third device 3000.

The first device 1000 may request device information from each neighboring device, and may determine a third device 3000 based on the device information received from the neighboring devices. In this case, the third device 1000 may broadcast a device information request to the neighboring devices. The first device 1000 may also request device information from devices within the home. However, exemplary embodiments are not limited thereto, and the first device 1000 may employ other techniques to obtain device information.

The first device 1000 may previously set a third device 3000 for receiving information related to the communication request depending on the type of the communication request. Also, the first device 1000 may determine a third device 3000 corresponding to the type of the communication request, based on user input.

When the first device 1000 receives user location information from a gateway (not shown), the first device 1000 may determine a third device 3000 based on the user location information received from the gateway. The user location information received from the gateway may include information about which of the devices within the home the user is near. The first device 1000 may determine a device for processing the communication request, among the neighboring devices near the user of the first device 100, as the third device 3000 to which the first device 1000 will transmit the information related to the communication request.

In operation S240, the first device 1000 transmits the information related to the communication request to the third device 3000. When the first device 1000 receives a call request from the second device 2000, the first device 1000 may provide call request information of the second device 2000 to the third device 300. The first device 1000 may relay call data (examples: voice data or video data) related to communication to perform communication between the third device 3000 and the second device 2000.

When the first device 1000 receives a message from the second device 2000, the first device 1000 may provide, to the third device 3000, at least one of the received message, a phone number of the second device 2000, and connection information for communication with the second device 2000. The first device 1000 may also provide a message received from the third device 3000 to the second device 2000.

The first device 1000 may transform the information related to the communication request into a format compatible with the third device 3000, and provide the transformed information to the third device 3000. In this regard, the first device 1000 may receive information about a data format compatible with the third device 3000 from an external device or a server. For example, the first device 1000 may receive information about applications installed in the third device 3000, and a codec and file extensions supported by the third device 3000, as well as other information related to data formats.

Figure 4:
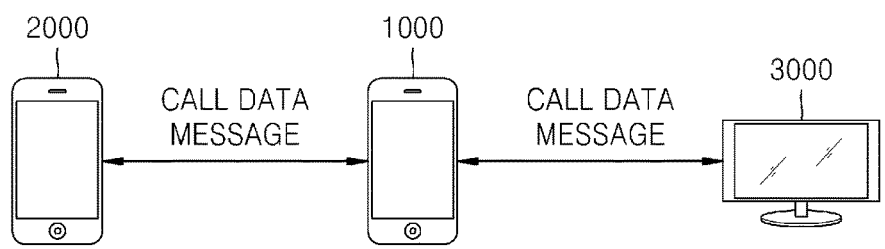
FIG. 4 is a view illustrating transmission and reception of communication information between a second device and a third device via a first device in a communication information transmission system according to an exemplary embodiment.

FIG. 4 is a view illustrating transmission and reception of communication information between a second device 2000 and a third device 3000 via a first device 2000 in a communication information transmission system according to an exemplary embodiment.

Referring to FIG. 4, in the communication information transmission system according to an exemplary embodiment, the first device 1000 may provide call information and a message received from the second device 2000 to the third device 3000, and may provide the call information and message received from the third device 3000 to the second device 2000.

Figure 5:
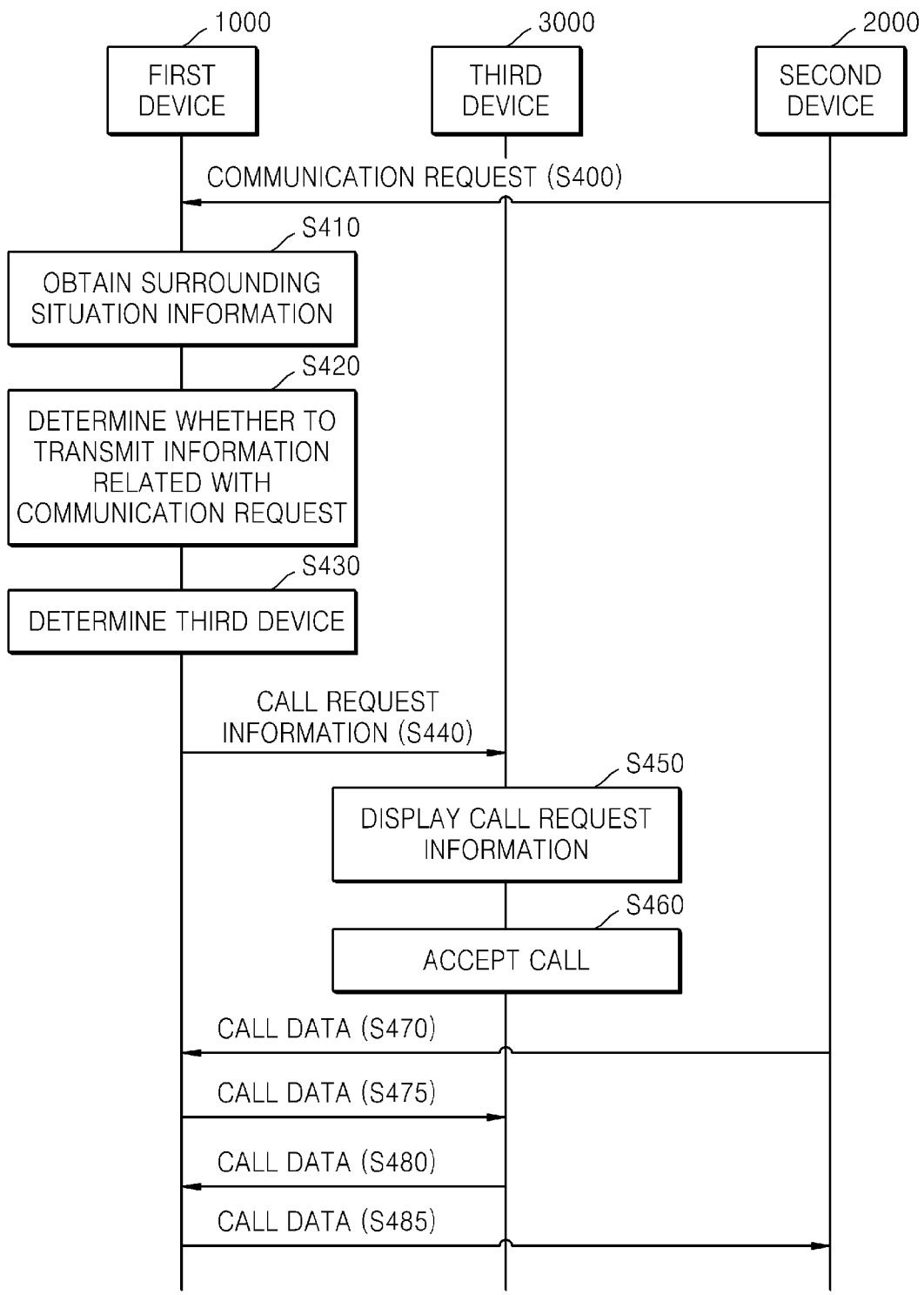
FIG. 5 is a flowchart of a call communication method between a second device and a third device via a first device when the second device initiates a call request with the first device, according to an exemplary embodiment.

FIG. 5 is a flowchart of method for performing call communication between a second device 2000 and a third device 3000 via a first device 1000 when the second device 2000 initiates a call request with the first device 1000, according to an exemplary embodiment.

In operation S400, the first device 1000 receives a call request from the second device 2000. The first device 1000 may receive at least one of a voice call request and a video call request from the second device 2000. When a call request is received from the second device 2000, the first device 1000 audibly alerts the user of the call request, or otherwise alerts the user using another technique (e.g., vibration, etc.).

In operation S410, the first device 1000 obtains surrounding situation information of the first device 1000. The first device 1000 may obtain the surrounding situation information of the first device 1000 by using at least one of a camera, a microphone, and a sensor in the first device 1000.

For example, the first device 1000 may use a camera to shoot surroundings of the first device 1000. When the first device 1000 shoots a moving picture, frames of the shot moving picture may be compared against one another to identify a difference in color or brightness. When a user is identified in the shot image, the first device 1000 may identify if the user is an authorized user of the first device 1000.

For example, the first device 1000 may also record sounds around the first device 1000 by using a microphone. The first device 1000 may also monitor a volume variation in the recorded sound. For example, when the first device 1000 is picked up by a user of the first device 1000, the first device 1000 may detect a volume variation in the sounds around the first device 1000.

The first device 1000 may obtain surrounding situation information of the first device 1000 by using various sensors. For example, the various sensors may include at least one of a gyro sensor, a geo-magnetic sensor, an accelerometer sensor, a gravity sensor, a light sensor, a proximity sensor, a barometer, a motion recognition sensor, a compass, and an RGB sensor. The first device 1000 may monitor a variation in values obtained from the surrounding situation information sensed by the various sensors.

In operation S420, the first device 1000 determines whether to transmit information related to the call request. The first device 1000 determines whether a user is in the vicinity of the first device 1000, and whether that user is an authorized user of the first device 1000.

For example, when a user picks up the first device 1000 or moves toward the first device 1000, the brightness of an image shot by the first device 1000 may become darker or the volume of a recorded voice may increase. Accordingly, the first device 1000 may determine that a user is in the vicinity of the first device 100 by sensing these changes. If a user moves while carrying the first device 1000, the first device 1000 may sense the movement of the first device 1000 by using a motion sensor. As a result, the first device 1000 may determine that a user is in the vicinity of the first device 1000 based on the sensed movement.

The first device 1000 may sense the face of a user in a shot image, and determine whether the user in the shot image is an authorized user of the first device 1000. The first device 1000 may identify whether the user in the shot image is an authorized user of the first device 1000 based on a shape of the user's face, and shapes and positions of the user's eyes, nose, and mouth.

Whether the user in the shot image is an authorized user of the first device 1000 may be determined based on user information stored in a memory of the first device 1000. In this regard, a shot image of the authorized user of the first device 1000 may be stored in the memory of the first device 1000. In another exemplary embodiment, whether the user in the shot image is an authorized user of the first device 1000 may be determined based on user information stored in a server (not shown). For example, whether the user in the shot image is an authorized user of the first device 1000 may be determined based on a user image stored in an SNS server corresponding to the first device 1000.

The first device 1000 may determine whether the recorded voice is a voice of an authorized user of the first device 1000. In this regard, the voice of the authorized user of the first device 1000 may be previously stored in the first device 1000 or a server (not shown), in a similar fashion as the user image.

If it is determined that a user is not in the vicinity of the first device 1000, or that a user in the vicinity of the first device 1000 is not an authorized user, the first device 1000 may transmit the information related to the call request.

In operation S430, the first device 1000 determines a third device 1000 for processing the call request. The first device 1000 may search for and choose at least one of the third devices 3000 for performing call communication with the second device 2000.

In particular, the first device 1000 may request, from a server (not shown), device information about devices connectable with the first device 1000, and search for at least one of the third devices 3000 based on the device information received from the server. In this regard, the device information about devices connectable with the first device 1000 may be previously stored in the server. The server may be an external server located outside the home of the user or a home gateway for home networking, but is not limited thereto.

The device information may include various kinds of information about devices, for example, about types and functions of devices. For example, the information about device function may include information about at least one of a shooting function using a camera, a voice input function using a microphone, a voice output function using a speaker, a communication function, a printing function, and a displaying function.

The first device 1000 may determine the at least one third device 3000 based on a type of the requested communication. For example, when the first device 1000 receives a video call request from the second device 2000, the first device 1000 may determine a TV set with a shooting function, a voice input/output function, and a displaying function, among the neighboring devices around the first device 1000, as the third device 3000. For example, when the first device 1000 receives a video call request from the second device 2000, the first device 1000 may determine a mobile phone with a voice input/output function, among the neighboring devices around the first device 1000, as the third device 3000.

The first device 1000 may search for at least one third device 3000, and may determine to provide information related to the call request to every searched third device 3000. The first device 1000 may select a device from the searched third devices 3000 as a device for receiving the information related to the call request. In this regard, the searched at least one third device 3000 may determine whether a user is in the vicinity of the first device 1000, and the first device 1000 may select the third device that is closest to the user of the first device 1000 as a device to be provided with the information related to the call request. In this regard, the third device 3000 may identify whether a user is in the vicinity of the third device 3000 by using a camera, a microphone, and various sensors in the third device 3000, although is not limited thereto.

The first device 1000 may request device information from each neighboring device, and may determine a third device 3000 based on the device information received from the neighboring devices. In this case, the third device 1000 may broadcast a device information request to the neighboring devices. The first device 1000 may also request device information from devices within the home. However, exemplary embodiments are not limited thereto.

In operation S440, the first device 1000 transmits call request information to the third device 3000. For example, the first device 1000 may provide information about a phone number of the second device 2000, a call receipt time, and a user name of the second device 2000 to the third device 3000.

In operation S450, the third device 3000 displays the received call request information. The third device 2000 may display the call request information received from the first device 1000 on a screen of the third device 3000.

In operation S460, the third device 3000 may accept a call from the second device 2000. The third device 3000 may determine whether to accept a call from the second device 2000 based on user input.

In operations S470 to S485, the second device 2000 and the third device 3000 may perform a call communication operation with each other through transmission and reception of call data between each other via the first device 1000.

In particular, in operation S470, the first device 1000 may receive call data from the second device 2000. In operation S475, the first device 1000 may transmit the received call data to the third device 3000. In this regard, the first device 1000 may transform the call data received from the second device 2000 into a format compatible with the third device 3000, and provide the transformed information to the third device 3000.

In operation S480, the first device 1000 may receive call data from the third device 3000. In operation S485, the first device 1000 may transmit the received call data to the second device 2000. In this regard, the first device 1000 may transform the call data received from the third device 3000 into a format compatible with the second device 2000, and provide the transformed information to the second device 2000.

Figure 6:
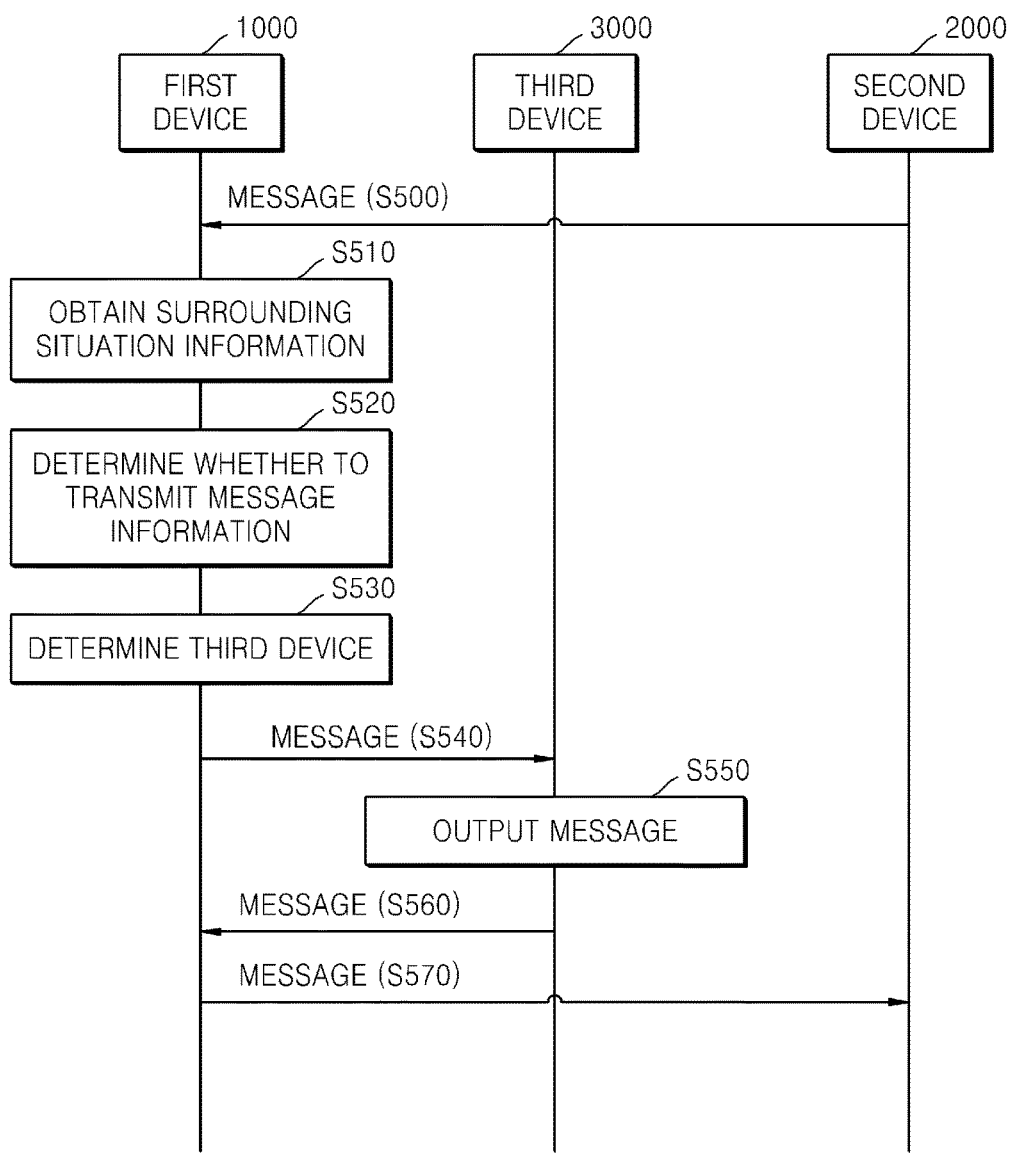
FIG. 6 is a flowchart of a message transmission and reception method between a second device and a third device via a first device when the second device transmits a message to the first device, according to an exemplary embodiment.

FIG. 6 is a flowchart of a message transmission and reception method between a second device 2000 and a third device 3000 via a first device 1000 when the second device 2000 transmits a message to the first device 1000, according to an exemplary embodiment.

In operation S500, the first device 1000 receives a message from the second device 2000. The message may be any type of message transmitted via various types of technologies, for example, an e-mail, a short message service (SMS), a multimedia messaging service (MMS), or a messenger program.

In operation S510, the first device 1000 obtains surrounding situation information of the first device 1000. The first device 1000 may obtain the surrounding situation information of the first device 1000 by using at least one of a camera, a microphone, and a sensor in the first device 1000.

In operation S520, the first device 1000 determines whether to transmit message information. The first device 1000 may determine whether a user is in the vicinity of the first device 1000, and whether that user is an authorized user of the first device 1000. If it is determined that a user is not in the vicinity of the first device 1000, or that a user in the vicinity of the first device 1000 is not an authorized user, the first device 1000 may transmit the message information to the third device 3000.

In operation S530, the first device 1000 determines a third device 1000 for processing the message received from the second device 2000. The first device 1000 may determine a third device 3000 for transmitting or receiving the message to or from the second device 2000 or for printing out the message received from the second device 2000. The first device 1000 may search for and choose at least one third device 3000 among the neighboring devices.

For example, when the first device 1000 receives a message from the second device 2000, the first device 1000 may determine a laptop with a displaying function and a network communication function, among the neighboring devices, as the third device 3000. For example, when the first device 1000 receives a message from the second device 2000, the first device 1000 may determine a printer with a printing function, among the neighboring devices, as the third device 300.

In operation S540, the first device 1000 may transmit the message to the third device 3000. The first device 1000 may transform the message received from the second device 2000 into a format compatible with the third device 3000. The first device 1000 may also provide the transformed message to the third device 3000.

In operation S550, the third device 3000 may output the received message. For example, the third device 3000 may display the message received from the first device 1000 on a screen of the third device 3000. When the third device 3000 has a printing function, the third device 2000 may print out the message received from the first device 1000.

In operations S560 to S570, the third device 3000 provides a message to the second device 2000 via the first device 1000. In particular, in operation S560, the third device may transmit a message for the second device 2000 to the first device 1000. In operation S570, the first device 1000 may transmit the message received from the third device 3000 to the second device 2000. In this regard, the first device 1000 may transform the message received from the third device 3000 into a format compatible with the second device 2000, and may provide the transformed message to the second device 2000.

Figure 7:
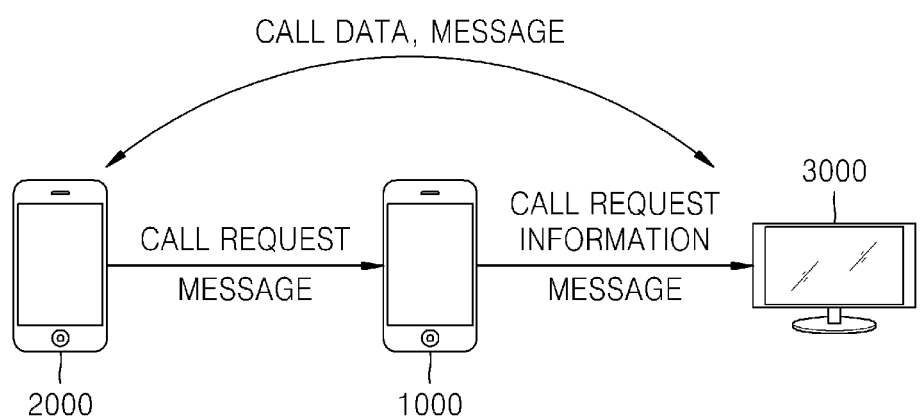
FIG. 7 is a view illustrating direct transmission and reception of communication information between a second device and a third device in a communication information transmission system according to an exemplary embodiment.

FIG. 7 is a view illustrating direct transmission and reception of communication information between a second device 2000 and a third device 3000 in a communication information transmission system according to an exemplary embodiment.

Referring to FIG. 7, when the second device 2000 transmits a call request or message to a first device 1000, the first device 1000 may transmit call request information or message information of the second device 2000 to the third device 3000. Then, the second device 2000 and the third device 3000 may directly establish a voice call with each other or may directly transmit a message to or receive a message from each other, without relaying via the first device 1000.

In this regard, the call request information and message information may include connection information for connection between the third device 3000 and the second device 2000. The connection information may include at least one of a phone number and an IP address of the second device 2000. When the third device 3000 receives a phone number of the second device 2000, the third device 3000 may obtain an IP address of the second device 2000 via a softswitch system (not shown) or other such system known to those skilled in the art by using the received phone number, and may make an Internet phone call to the second device 2000 by using the obtained IP address of the second device 2000. When the third device 3000 receives an IP address of the second device 2000 from the first device 1000, the third device 3000 may make an Internet phone call to the second device 2000 by using the received IP address.

When the third device 3000 is a device able to perform mobile communication via a mobile communication network, the third device 3000 may perform a mobile communication with the second device 2000 by using the phone number of the second device 2000.

Figure 8:
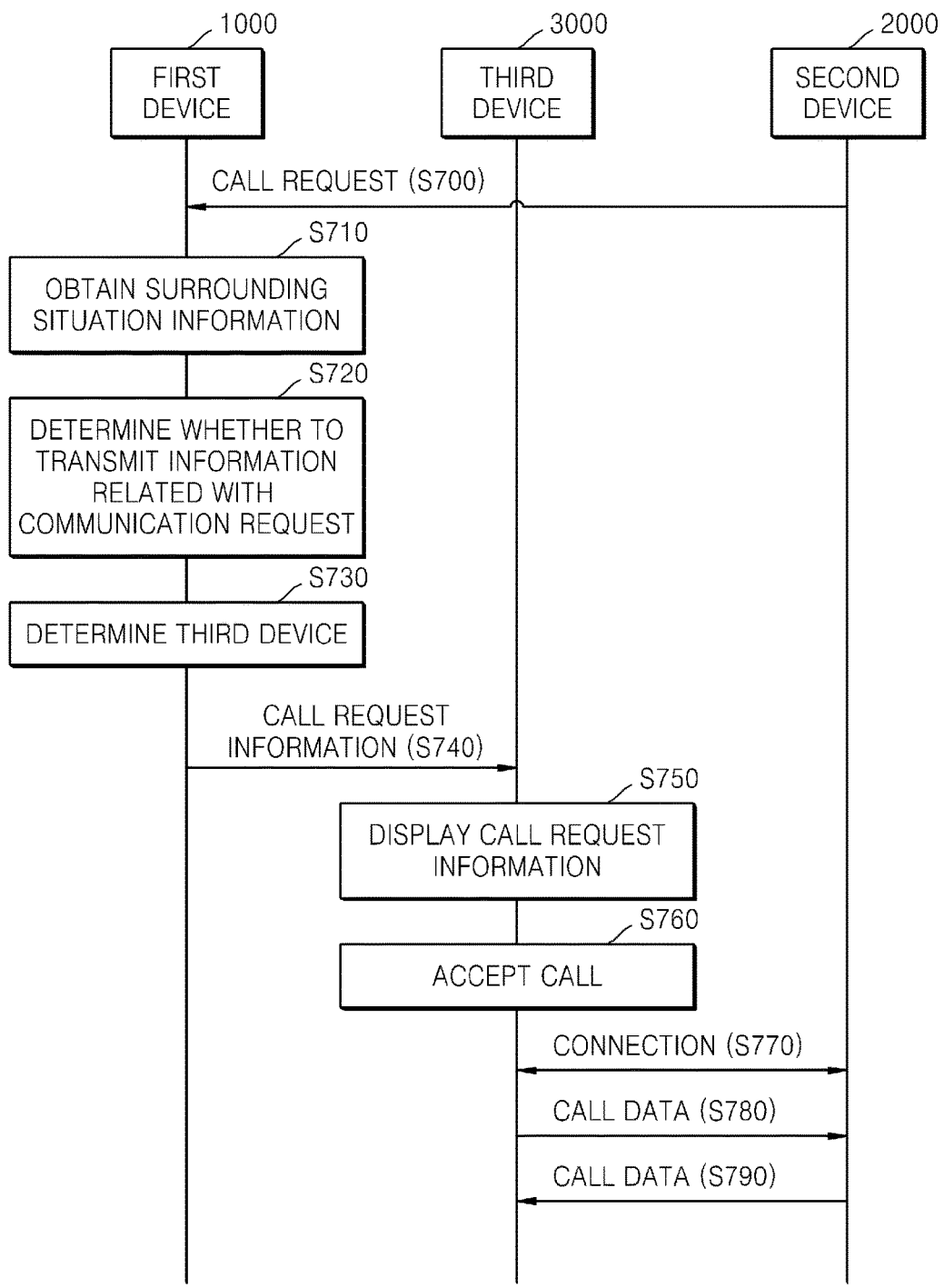
FIG. 8 is a flowchart of a call communication method between a second device and a third device, without relaying via a first device when the second device initiates a call request with the first device, according to an exemplary embodiment.

FIG. 8 is a flowchart of a direct call communication method between a second device 2000 and a third device 3000, without relaying via a first device 1000 when the second device 2000 initiates a call request with the first device 1000, according to an exemplary embodiment.

Operations S700 to S760 in FIG. 8 correspond to operations S400 to S460 of FIG. 5, and thus only operations S770 to S790 in FIG. 8 will be described below. Unlike the method of FIG. 5, call request information provided to the third device 3000 by the first device 1000 may include connection information for connection of the third device 3000 to the second device 2000. The connection information may include at least one of a phone number and IP address of the second device 2000.

In operation S770, the third device 3000 is connected to the second device 2000. The third device 3000 may request a call connection from the second device 2000 by using the call request information received from the first device 1000.

When the third device 3000 receives a phone number of the second device 2000, the third device 3000 may obtain an IP address of the second device 2000 via a softswitch system (not shown) or other type of system by using the received phone number, and may make an Internet phone call to the second device 2000 by using the obtained IP address of the second device 2000. When the third device 3000 receives an IP address of the second device 2000 from the first device 1000, the third device 3000 may make an Internet phone call to the second device 2000 by using the received IP address.

When the third device 3000 is a device configured to perform mobile communication via a mobile communication network, the third device 3000 may perform a mobile communication with the second device 2000 by using the phone number of the second device 2000.

In operation S780, the third device 3000 provides call data to the second device 2000. In operation S790, the second device 2000 provides call data to the third device 3000. For a video call between the second device 2000 and the third device 3000, the call data may include video data and voice data. For a voice call between the second device 2000 and the third device 3000, the call data may include voice data.

Figure 9:
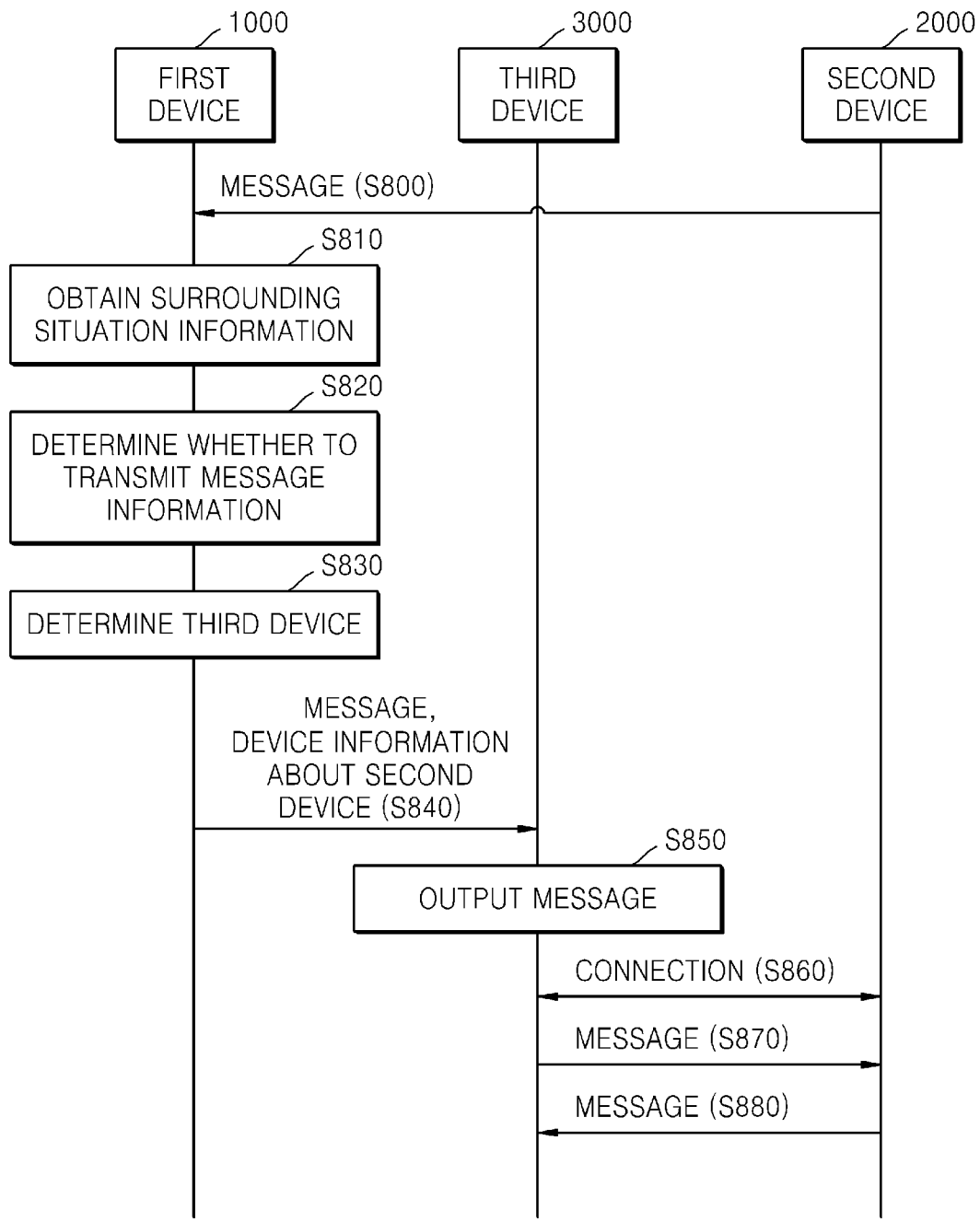
FIG. 9 is a flowchart of a direct message transmission and reception method between a second device and a third device, without relaying via a first device when the second device transmits a message to a first device, according to an exemplary embodiment.

FIG. 9 is a flowchart of a direct message transmission and reception method between a second device 2000 and a third device 3000, without relaying via a first device 1000 when the second device 2000 transmits a message to a first device 1000, according to an exemplary embodiment.

Operations S800 to S830 in FIG. 9 correspond to operations S500 to S530 of FIG. 6, and thus only operations S840 to S880 in FIG. 9 will be described below.

In operation S840, the first device 1000 transmits device information about the second device 2000 and a message to the third device 3000. The first device 1000 may provide the message received from the second device 2000, a phone number of the second device 2000, and connection information for communication with the second device 2000, to the third device 3000.

In operation S850, the third device 3000 outputs the received message. The third device 3000 may display the message received from the first device 1000 on a screen of the third device 3000. When the third device 3000 has a printing function, the third device 2000 may print out the message received from the first device 1000.

In operation S860, the third device 3000 is connected to the second device 2000. The third device 3000 may be connected to the second device 2000 based on the device information about the second device 2000 received from the first device 1000.

In operation S870, the third device 3000 transmits a message to the second device 2000. In operation S880, the second device 2000 transmits a message to the third device 3000.

Figure 10:
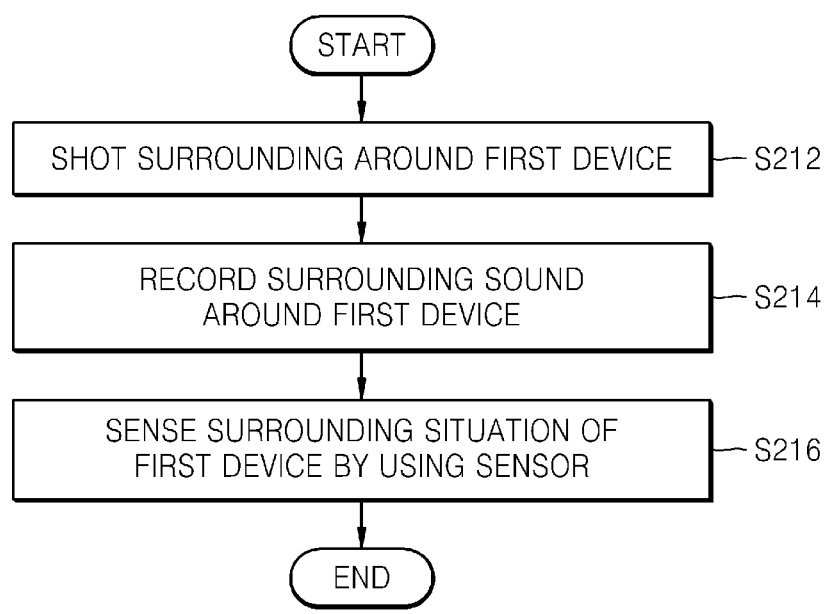
FIG. 10 is a flowchart of a surrounding situation information obtaining method performed by a first device, according to an exemplary embodiment.

FIG. 10 is a flow chart of a surrounding situation information obtaining method by a first device 1000, according to an exemplary embodiment.

In operation S212, the first device 1000 shoots surroundings around the first device 1000. The first device 1000 may shoot surroundings by using a camera. In particular, the first device 1000 may execute a camera application upon the reception of a call request from the second device 2000, and may control the camera application to shoot surroundings of the first device 1000. The first device 1000 may also determine whether to activate a front camera or a rear camera depending on a positional state of the first device 1000.

In operation S214, the first device 1000 records surrounding sounds around the first device 1000. The first device 1000 may record surrounding sounds around the first device 1000 by using a microphone. In particular, the first device 1000 may execute a sound recording application upon the reception of a call request from the second device 2000, and may control the sound recording application to record sounds around the first device 1000. The first device 1000 may also monitor a volume variation in the recorded sound. For example, when the first device 1000 is picked up by a user, the first device 1000 may detect a volume variation in the sounds around the first device 1000.

In operation S216, the first device 1000 senses its own surrounding situation by using a sensor or a combination of sensors. The first device 1000 may obtain surrounding situation information by using various sensors. In particular, the first device 1000 may execute a sensor application upon the reception of a call request from the second device 2000, and may control the sensor application to obtain surrounding situation information of the first device 1000. For example, the various sensors may include at least one of a gyro sensor, a geo-magnetic sensor, an accelerometer sensor, a gravity sensor, a light sensor, a proximity sensor, a barometer, a motion recognition sensor, a compass, and an RGB sensor. The first device 1000 may monitor a variation in values obtained from the surrounding situation information sensed by the various sensors.

Figure 11:
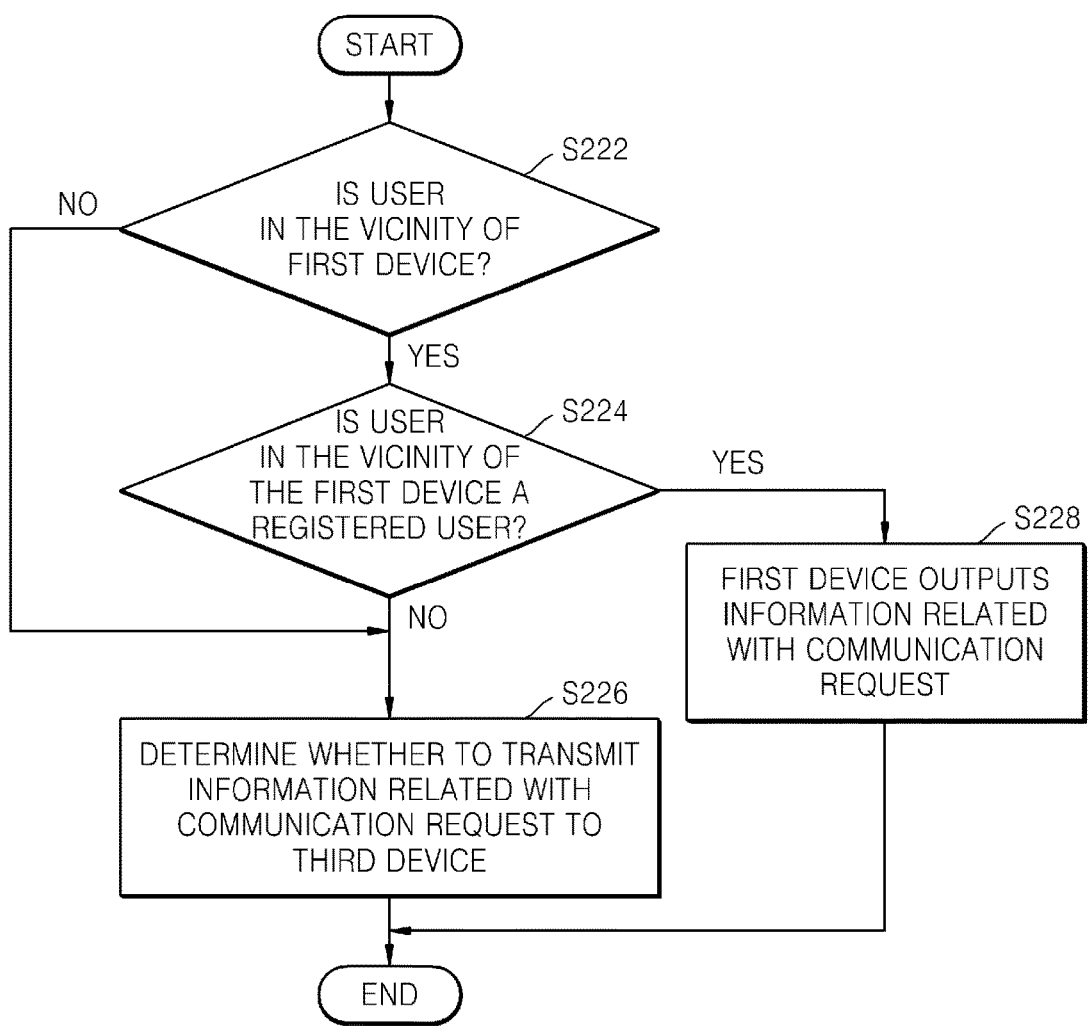
FIG. 11 is a flowchart of a method in which a first device determines whether to transmit information related with the communication request to a third device, according to an exemplary embodiment.

FIG. 11 is a flowchart of a method in which a first device 1000 determines whether to transmit information related to the communication request to a third device, according to an exemplary embodiment.

In operation S222, the first device 1000 determines whether a user is in the vicinity of the first device 1000. The first device 1000 may determine whether a user is in the vicinity of the first device 1000 based on the obtained surrounding situation information. For example, when a user picks up the first device 1000 or moves toward the first device 1000, the brightness of an image shot by the first device 1000 may become darker or the volume of a recorded voice may increase. Accordingly, the first device 1000 may determine that a user is in the vicinity of the first device 100 by sensing these changes. When a user is in the shot image, the first device 1000 may determine that a user is in the vicinity of the first device 1000. If a user moves while carrying the first device 1000, the first device 1000 may sense the movement of the first device 1000 by using a motion sensor. Then, the first device 1000 may determine that a user is in the vicinity of the first device 1000 based on the sensed movement.

If it is determined that a user is in the vicinity of the first device 1000 in operation S222, the first device 1000 performs operation S224. Otherwise, if it is determined that a user is not in the vicinity of the first device 1000, the first device 1000 performs operation S226.

In operation S224, the first device 1000 determines whether the user in the vicinity of the first device 1000 is an authorized user of the first device 1000. The first device 1000 may determine whether the user in the vicinity of the first device 1000 is an authorized user of the first device 1000 based on the obtained surrounding situation information. For example, the first device 1000 may detect the face of the user in a shot image, and determine whether the user in the shot image is an authorized user of the first device 1000. The first device 1000 may identify whether the user in the shot image is an authorized user of the first device 1000 based on various criteria, such as, for example, a shape of the user's face, and shapes and positions of the user's eyes, nose, and mouth.

Whether the user in the shot image is an authorized user of the first device 1000 may be determined based on user information stored in a memory of the first device 1000. In this regard, a shot image of the authorized user of the first device 1000 may be stored in the memory of the first device 1000. In another exemplary embodiment, whether the user in the shot image is an authorized user of the first device 1000 may be determined based on user information stored in a server (not shown). For example, whether the user in the shot image is an authorized user of the first device 1000 may be determined based on a user image stored in an SNS server corresponding to the first device 1000.

The first device 1000 may determine whether the recorded voice is a voice of an authorized user of the first device 1000. In this regard, the voice of the authorized user of the first device 1000 may be previously stored in the first device 1000 or a server (not shown).

If it is determined in operation S224 that a user in the vicinity of the first device 1000 is an authorized user, the first device 1000 performs operation S228. If it is determined in operation S224 that the user in the vicinity of the first device 1000 is not an authorized user, the first device 1000 performs operation S226.

In operation S226, the first device 1000 determines whether to transmit the information related to communication request to the third device 3000. If it is determined that a user is not in the vicinity of the first device 1000, or that the user in the vicinity of the first device 1000 is not an authorized user, the first device 1000 may transmit the information related to the communication request.

In operation S228, the first device 1000 outputs the information related to the communication request. The first device 1000 may output the information related to the communication request through a display and a speaker of the first device 1000.

Figure 12:
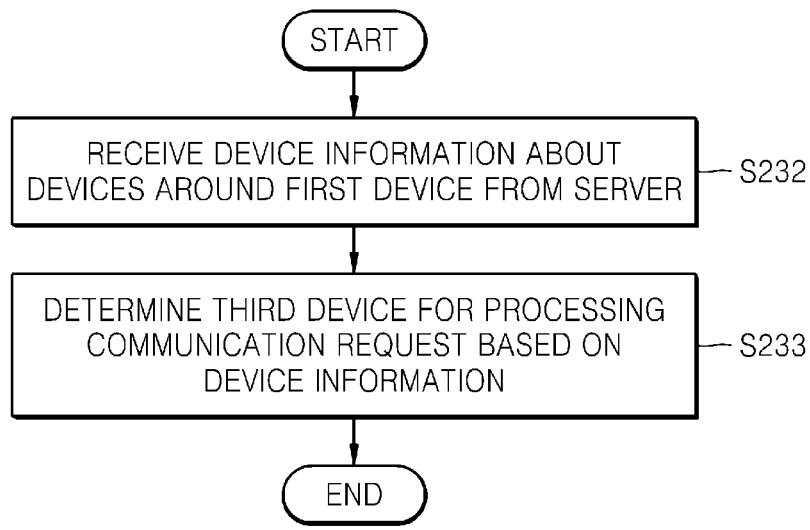
FIG. 12 is a flowchart of a method in which a first device determines a third device for processing a communication request based on device information received from a server, according to an exemplary embodiment.

FIG. 12 is a flowchart of a method in which a first device 1000 determines a third device for processing a communication request based on device information received from a server (not shown), according to an exemplary embodiment.

In operation S232, the first device 1000 receives device information about the neighboring devices around the first device 1000. In particular, the first device 1000 may request, from a server (not shown), device information about devices connectable with the first device 1000, and receive the device information about the devices connectable with the first device 1000 from the server. In this regard, the device information about devices connectable with the first device 1000 may be previously stored in the server. The server may be an outdoor server or a home gateway for home networking, but is not limited thereto.

The device information may include various kinds of information about devices, for example, information about types and functions of devices. For example, the information about device function may include information about at least one of a shooting function using a camera, a voice input function using a microphone, a voice output function using a speaker, a communication function, a printing function, and a displaying function.

In operation S233, the first device 1000 determines the third device 3000 for processing a communication request based on the device information. The first device 1000 may determine the third device 3000 based on a type of the requested communication. For example, when the first device 1000 receives a video call request from the second device 2000, the first device 1000 may determine a TV set with a shooting function, a voice input/output function, and a displaying function, among the neighboring devices around the first device 1000, as the third device 3000. For example, when the first device 1000 receives a message from the second device 2000, the first device 1000 may determine a laptop with a displaying function and a network communication function, among the neighboring devices, as the third device 3000. For example, when the first device 1000 receives a message from the second device 2000, the first device 1000 may also determine a printer with a printing function, among the neighboring devices, as the third device 300.

The first device 1000 may search for at least one third device 3000, and determine whether to provide the communication information to every searched third device 3000. The first device 1000 may select a device from the searched third devices 3000 as a device for receiving the communication information. According to an exemplary embodiment, the searched third devices 3000 may each determine whether a user is in the vicinity of the first device 1000, and the first device 1000 may select the third device that is determined to be closest to the user of the first device 1000 as a device to be provided with the information related to the communication request. In this regard, each of the third devices 3000 may identify whether a user is in the vicinity of the third device 3000 by using a camera, a microphone, and various sensors in the third device 3000.

Figure 13:
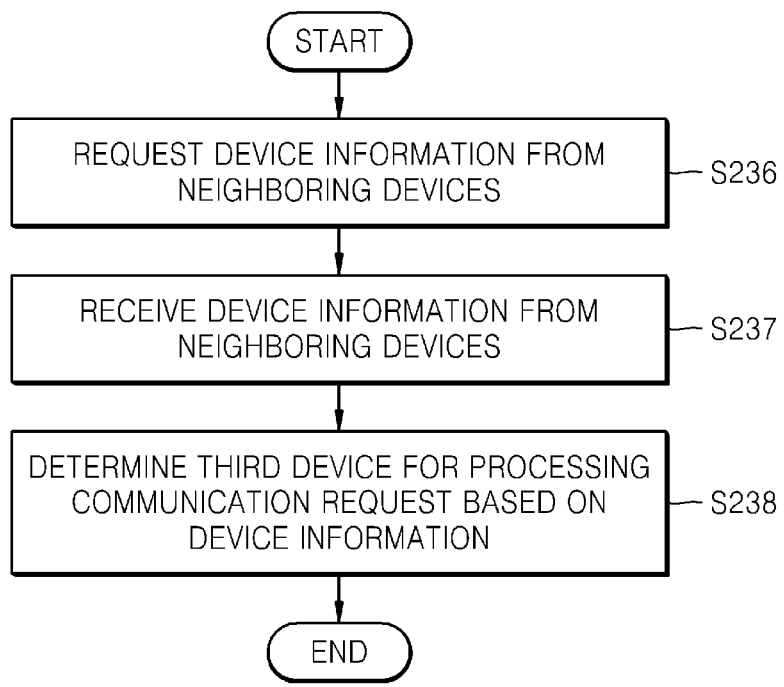
FIG. 13 is a flowchart of a method in which a first device determines a third device for processing a communication request based on device information received from neighboring devices around the first device, according to an exemplary embodiment.

FIG. 13 is a flowchart of a method in which a first device determines a third device for processing a communication request based on device information received from neighboring devices around the first device, according to an exemplary embodiment.

In operation S236, the first device 1000 requests device information about the neighboring devices around the first device 1000. The first device 1000 may broadcast a device information request to the devices connectable with the first device 1000.

In operation S237, the first device 1000 receives device information from the neighboring devices. The first device 1000 may receive device information from the devices connectable with the first device 1000. The devices connectable with the first device 1000 may be devices within the home or external devices outside the home.

In operation S238, the first device 1000 determines the third device 3000 for processing a communication request based on the device information received from the neighboring devices. The first device 1000 may determine the third device 3000 based on a type of the requested communication. For example, when the first device 1000 receives a video call request from the second device 2000, the first device 1000 may determine a TV set with a shooting function, a voice input/output function, and a displaying function, among the neighboring devices around the first device 1000, as the third device 3000. For example, when the first device 1000 receives a message from the second device 2000, the first device 1000 may determine a laptop with a displaying function and a network communication function, among the neighboring devices, as the third device 3000. For example, when the first device 1000 receives a message from the second device 2000, the first device 1000 may determine a printer with a printing function, among the neighboring devices, as the third device 300.

The first device 1000 may search for at least one third device 3000, and determine to provide the communication information to every searched third device 3000. The first device 1000 may select a device from the searched third devices 3000 as a device for receiving the communication information. According to an exemplary embodiment, the searched third devices 3000 may each determine whether a user is in the vicinity of the first device 1000, and the first device 1000 may select the third device that is closest to the user of the first device 1000 as a device to be provided with the information related to the communication request. In this regard, the third device 3000 may identify whether a user is in the vicinity of the third device 3000 by using a camera, a microphone, and various sensors in the third device 3000.

Figure 14:
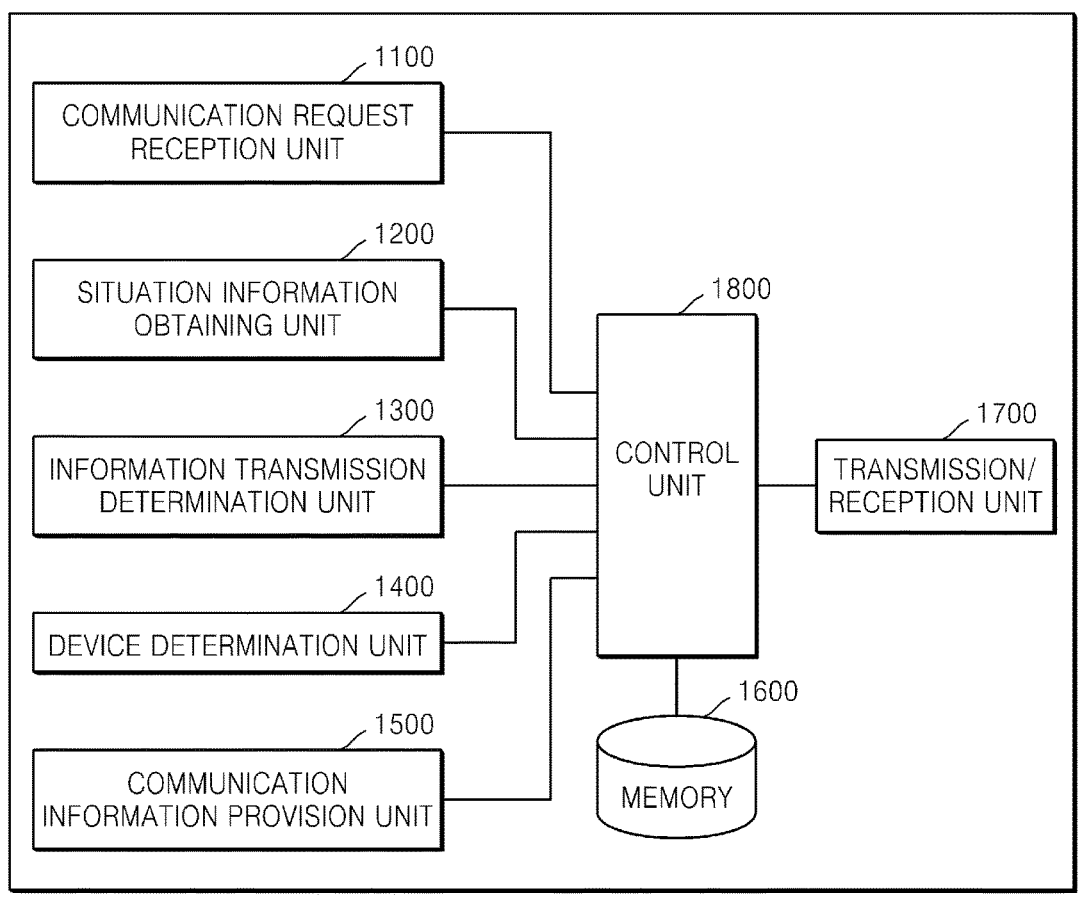
FIG. 14 is a block diagram of a first device according to an exemplary embodiment.

FIG. 14 is a block diagram of a first device 1000 according to an exemplary embodiment.

Referring to FIG. 14, the first device 1000 includes a communication request reception unit 1100, a situation information obtaining unit 1200, an information transmission determination unit 1300, a device determination unit 1400, a communication information provision unit 1500, a memory 1600, a transmission/reception unit 1700, and a control unit 1800.

The communication request reception unit 1100 is configured to receive a communication request from a second device 2000. The communication request reception unit 1100 may receive a call request or a message from the second device 2000. The call request may be a voice call request or a video call request. The message may be various types of messages, such as, for example, a message transmitted via an e-mail, a short message service (SMS), a multimedia messaging service (MMS), a messenger program. When the communication request reception unit 1100 receives a call request from the second device 2000, the first device 1100 may audibly alert the user of the call request.

The situation information obtaining unit 1200 is configured to obtain surrounding situation information of the first device 1000. The situation information obtaining unit 1200 may obtain the surrounding situation information of the first device 1000 by using at least one of a camera, a microphone, and a sensor in the first device 1000.

For example, the situation information obtaining unit 1200 may use a camera to shoot surroundings of the first device 1000. When the first device 1000 shoots a moving picture, frames of the shot moving picture may be compared against one another to identify a difference in color or brightness. When a user is identified in the shot image, the situation information obtaining unit 1200 may identify if the user is a user of the first device 1000.

For example, the situation information obtaining unit 1200 may record sounds around the first device 1000 by using a microphone. The situation information obtaining unit 1200 may also monitor a volume variation in the recorded sound. For example, when the first device 1000 is picked up by a user, the situation information obtaining unit 1200 may detect a volume variation in the sounds around the first device 1000.

The situation information obtaining unit 1200 may obtain surrounding situation information of the first device 1000 by using various sensors. For example, the various sensors may include at least one of a gyro sensor, a geo-magnetic sensor, an accelerometer sensor, a gravity sensor, a light sensor, a proximity sensor, a barometer, a motion recognition sensor, a compass, and an RGB sensor. The situation information obtaining unit 1200 may monitor a variation in values obtained from the surrounding situation information sensed by the various sensors.

The situation information obtaining unit 1200 may obtain surrounding situation information of the first device 1000 via a home network system (not shown). For example, the home network system may be implemented as a security system, but is not limited thereto. The home network may include a gateway (not shown), the first device 1000, a third device 3000, and various devices within the home. The various devices within the home may include, for example, a surveillance camera, a voice collection device, a temperature sensor, or a humidity sensor. The gateway may obtain situation information of the home through various devices within the home. For example, the gateway may receive an image shot by a surveillance camera, voice obtained via a voice recording device, and sensing information obtained via a temperature sensor and a humidity sensor. The situation information obtaining unit 1200 may also receive the obtained situation information from the gateway.

The information transmission determination unit 1300 is configured to determine whether to transmit information related to the communication request. The information transmission determination unit 1300 may determine whether a user is in the vicinity of the first device 1000, and whether that user is an authorized user of the first device 1000.

For example, when a user picks up the first device 1000 or moves toward the first device 1000, the brightness of an image shot by the first device 1000 may become darker or the volume of a recorded voice may increase. Accordingly, the information transmission determination unit 1300 may determine that a user is in the vicinity of the first device 100 by sensing these changes. If a user moves while carrying the first device 1000, the information transmission determination unit 1300 may sense the movement of the first device 1300 by using a motion sensor. Then, the information transmission determination unit 1300 may determine that a user is in the vicinity of the first device 1300 based on the sensed movement.

The information transmission determination unit 1300 may sense the face of a user in a shot image, and determine whether the user in the shot image is an authorized user of the first device 1000. The information transmission determination unit 1300 may identify whether the user in the shot image is an authorized user of the first device 1000 based on various criteria, such as, for example, a shape of the user's face, and shapes and positions of the user's eyes, nose, and mouth.

Whether the user in the shot image is an authorized user of the first device 1000 may be determined based on user information stored in a memory of the first device 1000. In this regard, a shot image of the authorized user of the first device 1000 may be stored in the memory of the first device 1000. In another exemplary embodiment, whether the user in the shot image is an authorized user of the first device 1000 may be determined based on user information stored in a server (not shown). For example, whether the user in the shot image is an authorized user of the first device 1000 may be determined based on a user image stored in an SNS server corresponding to the first device 1000.

The information transmission determination unit 1300 may determine whether the recorded voice is a voice of an authorized user of the first device 1000. In this regard, the voice of the authorized user of the first device 1000 may be previously stored in the first device 1000 or a server (not shown).

If it is determined that a user is not in the vicinity of the first device 1300, or that a user in the vicinity of the first device 1000 is not an authorized user, the information transmission determination unit 1300 may determine to transmit the information related to the communication request.

The information transmission determination unit 1300 may also determine whether a user is in the vicinity of the first device 1000 based on user location information received from the gateway (not shown). In this regard, the gateway may generate the user location information about the user's location based on situation information obtained by various devices within the home. For example, the gateway may generate user location information about the user's location at home based on an image shot by a surveillance camera, voice obtained via a voice recording device, and sensing information obtained via a temperature sensor and a humidity sensor. The user location information may include information about which of the home devices a user is closest to.

The information transmission determination unit 1300 may receive the user location information generated by the gateway, and may determine whether a user is in the vicinity of the first device 1000 based on the received user's location information.

The device determination unit 1400 is configured to determine a third device 1000 for processing the communication request. The device determination unit 1400 may search for and choose at least one of the third devices 3000 for processing the communication request. The processing of the communication request may include displaying the information related to the communication request or communicating with the second device 2000.

In particular, the device determination unit 1400 may request, from a server (not shown), device information about devices connectable with the first device 1000, and search for at least one of the third devices 3000 based on the device information received from the server. In this regard, the device information about devices connectable with the first device 1000 may be previously stored in the server. The server may be an external server outside the home or a home gateway for home networking, but is not limited thereto and may be various other types of servers.

The device information may include various kinds of information about devices, for example, about types and functions of devices. For example, the information about device function may include information about at least one of a shooting function using a camera, a voice input function using a microphone, a voice output function using a speaker, a communication function, a printing function, and a displaying function.

The device determination unit 1400 may determine at least one third device 3000 based on a type of the requested communication. For example, when the first device 1000 receives a video call request from the second device 2000, the device determination unit 1400 may determine a TV set with a shooting function, a voice input/output function, and a displaying function, among the neighboring devices around the first device 1000, as the third device 3000. For example, when the first device 1000 receives a message from the second device 2000, the device determination unit 1400 may determine a laptop with a displaying function and a network communication function, among the neighboring devices, as the third device 3000. For example, when the first device 1000 receives a message from the second device 2000, the device determination unit 1400 may determine a printer with a printing function, among the neighboring devices, as the third device 300.

The device determination unit 1400 may search for at least one third device 3000, and may, for example, determine to provide the communication information to every searched third device 3000. Also, the device determination unit 1400 may select a device from the searched third devices 3000 as a device for receiving the communication information. In this regard, the searched third devices 3000 may each determine whether a user is in the vicinity of the first device 1000, and the first device 1000 may select the third device that is determined to be closest to the user of the first device 1000 as a device to be provided with the information related to the communication request. In this regard, the third device 3000 may identify whether a user is in the vicinity of the third device 3000 by using a camera, a microphone, and various sensors in the third device 3000.

The device determination unit 1400 may request device information from each neighboring device, and may determine a third device 3000 based on the device information received from the neighboring devices. In this case, the device determination unit 1400 may broadcast a device information request to the neighboring devices. The device determination unit 1400 may also request device information from devices within the home. However, exemplary embodiments are not limited thereto, and the device determination unit 1400 may obtain the device information in many other ways.

The device determination unit 1400 may previously set a third device 3000 for receiving the information related to the communication request depending on the type of the communication request. The device determination unit 1400 may determine a third device 3000 corresponding to the type of the communication request, based on user input.

When the first device 1000 receives user location information from a gateway (not shown), the device determination unit 1400 may determine a third device 3000 based on the user location information received from the gateway. The user location information received from the gateway may include information about which of the devices within the home the user is closest to. The device determination unit 1400 may determine a device for processing the communication request, among the neighboring devices near the user of the first device 1000, as the third device 3000 to which the first device 1000 will transmit the information related to the communication request.

The communication information provision unit 1500 is configured to transmit the information related to the communication request to the third device 3000. When the first device 1000 receives a call request from the second device 2000, the communication information provision unit 1500 may provide call request information of the second device 2000 to the third device 300. The communication information provision unit 1500 may relay voice data or video data related to a call communication between the third device 3000 and the second device 2000.

When the first device 1000 receives a message from the second device 2000, the communication information provision unit 1500 may provide, to the third device 3000, at least one of the received message, a phone number of the second device 2000, and connection information for communication with the second device 2000. The communication information provision unit 1500 may also provide a message received from the third device 3000 to the second device 2000.

The communication information provision unit 1500 may transform the information related to the communication request received from the second device 2000 into a format compatible with the third device 3000, and provide the transformed information to the third device 3000. The communication information provision unit 1500 may also transform the communication information received from the third device 3000 into a format compatible with the second device 2000, and provide the transformed information to the second device 2000.

The memory 1600 is configured to store various kinds of information for enabling the first device 1000 to provide communication information to the third device 3000 based on situation information and to relay communication between the second device 2000 and the third device 3000. The memory 1600 may store, for example, predetermined information for determining whether a user is in the vicinity of the first device 1000, user information about an authorized user, predetermined information for selecting the third device 3000, and device information about the devices connectable with the first device 1000. However, examples of the information that the memory 160 may store are not limited thereto.

The transmission/reception unit 1700 is configured to transmit various types of information to and receive various types of information from the second device 2000 and the third device 300 in order for the first device 1000 to provide communication information to the third device 3000 based on situation information and to relay communication between the second device 2000 and the third device 3000.

The control unit 1800 is configured to control the communication request reception unit 1100, the situation information obtaining unit 1200, the information transmission determination unit 1300, the device memory determination unit 1400, the communication information provision unit 1500, the memory 1600, and the transmission/reception unit 1700 such that the first device 1000 may provide communication information to the third device 3000 based on situation information and may relay communication between the second device 1400 and the third device 3000.

The communication request reception unit 1100, the situation information obtaining unit 1200, the information transmission determination unit 1300, the device determination unit 1400, and the communication information provision unit 1500 may perform their own functions via software modules in the first device 1000. However, exemplary embodiments are not limited thereto.

Figure 15:
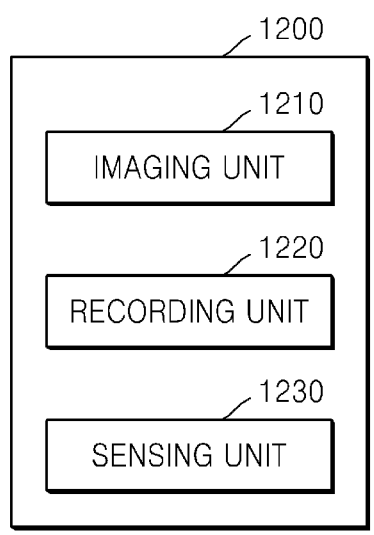
FIG. 15 is a detailed block diagram of a situation information obtaining unit in FIG. 14, according to an exemplary embodiment.

FIG. 15 is a detailed block diagram of the situation information obtaining unit 1200 in FIG. 14, according to an exemplary embodiment.

Referring to FIG. 15, the situation information obtaining unit 1200 according to the present exemplary embodiment includes an imaging unit 1210, a recording unit 1220, and a sensing unit 1230.

The imaging unit 1210 is configured to shoot (e.g., capture images of) surroundings of the first device 1000. The imaging unit 1210 may shoot surroundings of the first device 1000 by using a camera. In particular, the imaging unit 1210 may execute a camera application upon the reception of a call request from the second device 2000, and may control the camera application to shoot surroundings of the first device 1000. The imaging unit 1210 may determine whether to activate a front camera or a rear camera depending on a positional state of the first device 1000.

The recording unit 1220 is configured to record surrounding sounds around the first device 1000. The recording unit 1220 may record surrounding sounds around the first device 1000 by using a microphone. In particular, the recording unit 1220 may execute a sound recording application upon the reception of a call request from the second device 2000, and may control the sound recording application to record sounds around the first device 1000.

The sensing unit 1230 is configured to sense a surrounding situation of the first device 1000 by using a sensor. The sensing unit 1230 may obtain surrounding situation information of the first device 1000 by using various sensors. In particular, the sensing unit 1230 may execute a sensor application upon the reception of a call request from the second device 2000, and may control the sensor application to obtain surrounding situation information of the first device 1000. For example, the various sensors may include at least one of a gyro sensor, a geo-magnetic sensor, an accelerometer sensor, a gravity sensor, a light sensor, a proximity sensor, a barometer, a motion recognition sensor, a compass, and an RGB sensor.

Figure 16:
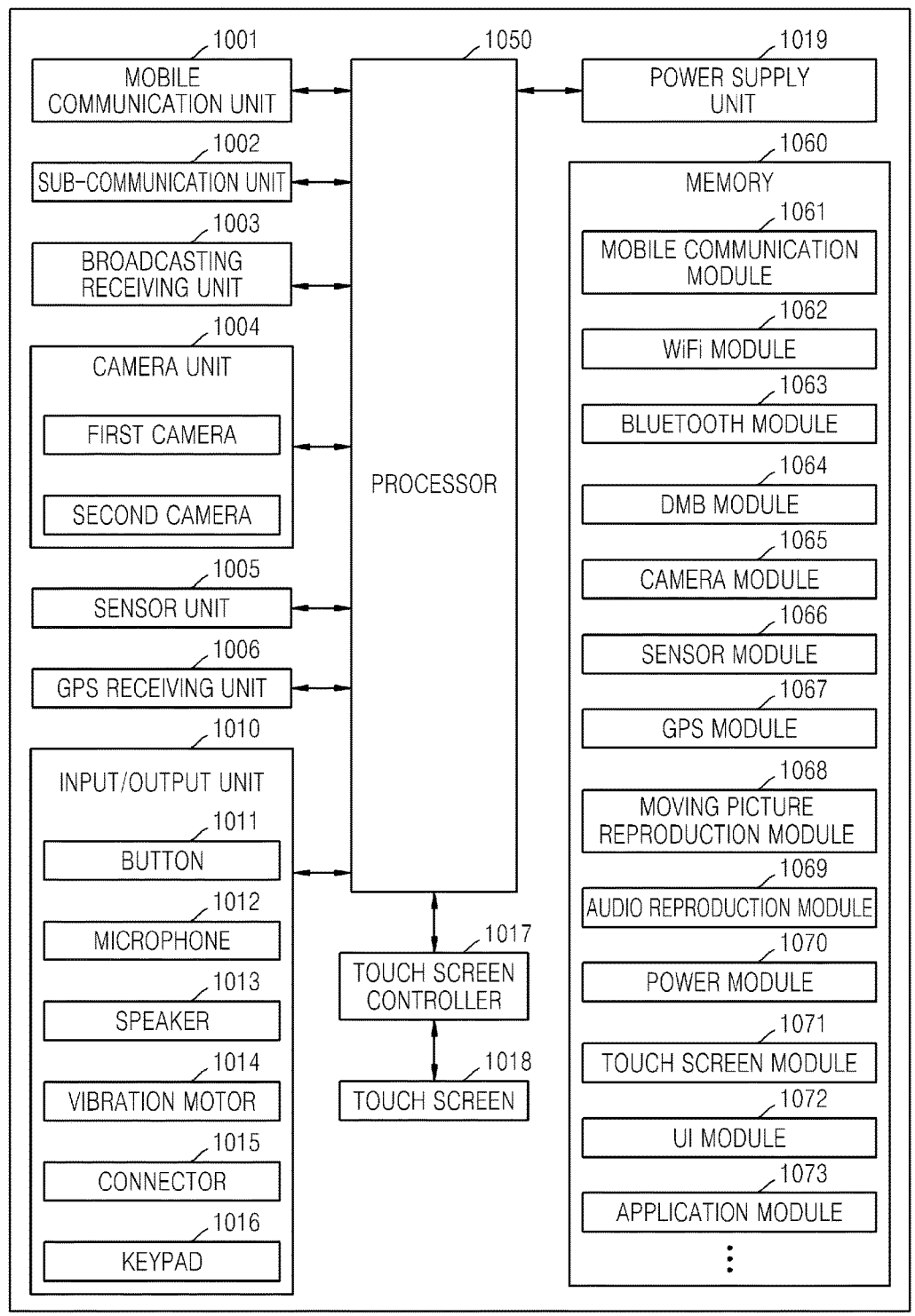
FIG. 16 is a block diagram of a first device according to another exemplary embodiment.

FIG. 16 is a block diagram of a first device 1000 according to another exemplary embodiment.

A mobile communication unit 1001 is configured to perform a call set-up, data communication, or the like with a base station via a cellular network such as a 3G/4G cellular network. A sub-communication unit 1002 is configured to perform a function for local communication, such as Bluetooth, near field communication (NFC), or the like. A broadcasting receiving unit 1003 is configured to receive a digital multimedia broadcasting (DMB) signal.

A camera unit 1004 includes a lens and optical devices for shooting an image or a moving picture, and may include one or a plurality of cameras.

A sensor unit 1005 may include a gravity sensor for detecting movement of the first device 1000, an illumination intensity sensor for detecting intensity of light, a proximity sensor for detecting proximity of a person, a motion sensor for detecting movement of a person, or the like.

A GPS receiving unit 1006 is configured to receive a GPS signal from a satellite or other source. Various services may be provided to a user by using the GPS signal.

An input/output unit 1010 is configured to provide an interface with an external device or a person. The input/output unit 1010 includes a button 1011, a microphone 1012, a speaker 1013, a vibration motor 1014, a connector 1015, and a keypad 1016.

A touch screen 1018 is configured to receive a touch input from a user. A touch screen controller 1017 delivers the touch input, which is input via the touch screen 1018, to a processor 1050. A power supply unit 1019 is connected to a battery or an external power source to supply a power to the first device 1000.

The processor 1050 is configured to execute programs stored in a memory 1060, thereby transmitting communication information as described in the above exemplary embodiments.

The programs stored in the memory 1060 may be divided into a plurality of modules according to their respective functions, for example, into a mobile communication module 1061, a WiFi module 1062, a Bluetooth module 1063, a DMB module 1064, a camera module 1065, a sensor module 1066, a GPS module 1067, a moving picture reproduction module 1068, an audio reproduction module 1069, a power module 1070, a touch screen module 1071, an UI module 1072, an application module 1073, and the like.

The functions of these modules may be intuitively understandable to one of ordinary skill in the art. The application module 1073 will now be described in greater detail herein.

The application module 1073 may receive a communication request from the second device 2000. The application module 1073 may receive a communication request from the second device 2000 by using at least one of the mobile communication module 1061, the WIFI module 1062, and the Bluetooth module 1063.

The application module 1073 may obtain surrounding situation information of the first device 1000. The application module 1073 may obtain surrounding situation information obtained from the camera unit 1004 and the sensor unit 1005 by using the camera module 1065 and the sensor module 1066. The application module 1073 may obtain surrounding sounds around the first device 1000 through the microphone 1012.

The application module 1073 may determine whether to transmit information related to the communication request to the third device 3000. The application module 1073 may determine whether a user is in the vicinity of the first device 1000, and whether that user is an authorized user of the first device 1000. If it is determined that a user is not in the vicinity of the first device 1000, or that a user in the vicinity of the first device 1000 is not an authorized user, the application module 1073 may transmit the information related to the communication request.

The application module 1073 may determine a third device 3000 for processing the communication request. The application module 1073 may search for and choose at least one third device 3000 for processing the communication request among the devices within the home.

The application module 1073 may transmit the information related to the communication request to the third device 3000. The application module 1073 may transmit the information related to the communication request to the third device 3000 by using at least one of the mobile communication module 1061, the WIFI module 1062, and the Bluetooth module 1063.

The application module 1073 may transform the information related to the communication request received from the second device 2000 into a format compatible with the third device 3000, and provide the transformed information to the third device 3000. The application module 1073 may also transform the communication information received from the third device 3000 into a format compatible with the second device 2000, and provide the transformed information to the second device 2000.

The one or more exemplary embodiments may be embodied as a recording medium, e.g., a program module to be executed in computers, which include computer-readable commands. The computer storage medium may include any usable medium that may be accessed by computers, including volatile and non-volatile media, and detachable and non-detachable media. Also, the computer storage medium may include a computer storage medium and a communication medium. The computer storage medium may include many types of volatile and non-volatile media, and detachable and non-detachable media, which are designed to store information including computer readable commands, data structures, program modules or other data. The communication medium includes computer-readable commands, a data structure, a program module, and other transmission mechanisms, and includes other information transmission mediums.

The exemplary embodiments may, however, be embodied in many different forms and should not be construed as being limited to the exemplary embodiments set forth herein; rather, these exemplary embodiments are provided so that this disclosure will be thorough and complete, and will fully convey the inventive concept to those of ordinary skill in the art.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A non-transitory computer readable recording medium having stored thereon instructions which cause a mobile device to perform operations comprising:
   receiving a text message destined for the mobile device from a remote device using a first wireless communication unit, the text message destined for the mobile device to be displayed on the mobile device;
   sensing whether movement of the mobile device occurs;
   transmitting message information to a neighboring device connected to the mobile device using a second wireless communication unit in response to determining that the mobile device is stationary based on the sensed movement of the mobile device, the transmitting of the message information being performed while the mobile device remains stationary, and the message information being used for displaying the text message destined for the mobile device on the neighboring device and including identification information regarding the remote device;
   receiving response information from the neighboring device using the second wireless communication unit, wherein the response information is based on user input at the neighboring device for responding to the text message destined for the mobile device; and
   transmitting a response message, as a response to the text message destined for the mobile device, to the remote device using the first wireless communication unit, wherein the response message is generated based on the response information.

2. The non-transitory computer readable recording medium of claim 1, wherein the program further causes the mobile device to perform an operation comprising:
   providing a message alert of the received message on the mobile device.

3. The non-transitory computer readable recording medium of claim 1, wherein the identification information comprises a phone number of the remote device.

4. The non-transitory computer readable recording medium of claim 1, wherein the text message is one of a short message service (SMS) or a multimedia messaging service (MMS).

5. The non-transitory computer readable recording medium of claim 1, wherein the response message is selected from among predetermined information.

6. A mobile device, comprising:
   a first wireless communication unit;
   a second wireless communication unit;
   a sensor configured to sense movement of the mobile device; and
   a processor configured to:
      control the first wireless communication unit to receive a text message destined for the mobile device from a remote device, the text message destined for the mobile device to be displayed on the mobile device;
      control the second wireless communication unit to transmit message information to a neighboring device connected to the mobile device in response to determining that the mobile device is stationary based on the sensed movement of the mobile device, the transmission of the message information being performed while the mobile device remains stationary, and the message information to be used for displaying the text message destined for the mobile device on the neighboring device and including identification information regarding the remote device, and to receive response information from the neighboring device, wherein the response information is based on user input at the neighboring device for responding to the text message destined for the mobile device; and
      control the first wireless communication unit to transmit a response message, as a response to the text message destined for the mobile device, to the remote device,
   wherein the response message is generated based on the response information.

7. The mobile device of claim 6, wherein the mobile device is further configured to provide a message alert of the received message on the mobile device.

8. The mobile device of claim 6, wherein the identification information comprises a phone number of the remote device.

9. The mobile device of claim 6, wherein the text message is one of a short message service (SMS) or a multimedia messaging service (MMS).

10. The mobile device of claim 6, wherein the response message is selected from among predetermined information.

11. The non-transitory computer readable recording medium of claim 1, wherein the identification information is used for responding to the text message destined for the mobile device.

12. A method performed by a mobile device, the method comprising:
   receiving, by a first wireless communication unit provided in the mobile device, a text message destined for the mobile device from a remote device, the text message destined for the mobile device to be displayed on the mobile device;
   sensing movement of the mobile device;
   transmitting, by a second wireless communication unit provided in the mobile device, message information to a neighboring device connected to the mobile device in response to determining that the mobile device is stationary based on the sensed movement of the mobile device, the transmitting of the message information being performed while the mobile device remains stationary, and the message information to be used for displaying the text message destined for the mobile device on the neighboring device and including identification information regarding the remote device;
   receiving, by the second wireless communication unit provided in the mobile device, response information from the neighboring device, wherein the response information is based on user input at the neighboring device for responding to the text message destined for the mobile device; and
   transmitting, by the first wireless communication unit provided in the mobile device, a response message, as a response to the text message destined for the mobile device, to the remote device,
   wherein the response message is generated based on the response information.

13. The method of claim 12, further comprising providing a message alert of the received message on the mobile device.

14. The method of claim 12, wherein the identification information comprises a phone number of the remote device.

15. The method of claim 12, wherein the text message is one of a short message service (SMS) or a multimedia messaging service (MMS).

16. The method of claim 12, wherein the response message is selected from among predetermined information.

* * * * *